(12) United States Patent
Seo

(10) Patent No.: US 11,169,430 B2
(45) Date of Patent: Nov. 9, 2021

(54) STOP MODULE AND CAMERA MODULE INCLUDING THE SAME

(71) Applicant: SAMSUNG ELECTRO-MECHANICS CO., LTD., Suwon-si (KR)

(72) Inventor: Bo Sung Seo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 16/274,471

(22) Filed: Feb. 13, 2019

(65) Prior Publication Data

US 2019/0346749 A1 Nov. 14, 2019

(30) Foreign Application Priority Data

May 10, 2018 (KR) .................. 10-2018-0053688
Aug. 6, 2018 (KR) .................. 10-2018-0091352

(51) Int. Cl.
G03B 9/06 (2021.01)
G03B 17/56 (2021.01)
G03B 3/10 (2021.01)
H04N 5/225 (2006.01)

(52) U.S. Cl.
CPC ............. *G03B 17/565* (2013.01); *G03B 3/10* (2013.01); *G03B 9/06* (2013.01); *H04N 5/2254* (2013.01)

(58) Field of Classification Search
CPC .................................. G03B 9/06; G02B 5/005
See application file for complete search history.

(56) References Cited

U.S. PATENT DOCUMENTS

| 4,797,700 A | * | 1/1989 | Tsuji ..................... G03B 9/02 396/505 |
| 5,432,576 A | * | 7/1995 | SanGregory ............ G03B 9/14 396/449 |
| 5,594,519 A | * | 1/1997 | Shimizu .................. G03B 9/22 396/449 |
| 8,475,064 B2 | | 7/2013 | Bai et al. |
| 10,422,975 B2 | | 9/2019 | Lo et al. |

(Continued)

FOREIGN PATENT DOCUMENTS

| CN | 1721968 A | 1/2006 |
| CN | 102419504 | 4/2012 |

(Continued)

OTHER PUBLICATIONS

Korean Office Action dated Nov. 14, 2019 in corresponding Korean Patent Application No. 10-2018-0091352 (7 pages in English, 6 pages in Korean).

(Continued)

*Primary Examiner* — Noam Reisner
(74) *Attorney, Agent, or Firm* — NSIP Law

(57) ABSTRACT

A stop module and a camera module including disclosed stop module. A stop module includes a base; blades sequentially overlapping each other on the base to rotate about separate rotation shafts to form incident holes having different sizes; and a driving portion including a magnet portion. One of the blades is a driving blade, which is directly interlocked with the magnet portion, and the blades other than the driving blade are driven to be directly or indirectly interlocked with the driving blade.

21 Claims, 23 Drawing Sheets

(56) References Cited

U.S. PATENT DOCUMENTS

| | | | |
|---|---|---|---|
| 2006/0002702 A1* | 1/2006 | Masuda | H04N 5/238 396/510 |
| 2009/0232488 A1 | 9/2009 | Viglione | |
| 2009/0232489 A1* | 9/2009 | Viglione | G03B 9/08 396/468 |
| 2012/0076486 A1* | 3/2012 | Bai | G03B 9/06 396/463 |
| 2013/0039641 A1 | 2/2013 | Kawamoto | |
| 2017/0324892 A1 | 11/2017 | Kim et al. | |
| 2018/0149829 A1 | 5/2018 | Lo et al. | |
| 2018/0213137 A1* | 7/2018 | Park | H04N 5/238 |
| 2020/0089080 A1* | 3/2020 | Hanaoka | G03B 7/12 |

FOREIGN PATENT DOCUMENTS

| | | |
|---|---|---|
| CN | 206479749 U | 9/2017 |
| JP | 05232542 A * | 9/1993 |
| JP | 5604246 B2 | 8/2014 |
| JP | 2017-198935 A | 11/2017 |
| KR | 10-2012-0032433 A | 4/2012 |
| KR | 10-2012-0135911 A | 12/2012 |
| KR | 10-2014-0146919 A | 12/2014 |
| KR | 10-1477247 B1 | 12/2014 |
| KR | 10-2016-0014057 A | 2/2016 |
| KR | 10-1700771 B1 | 1/2017 |
| KR | 10-2017-0093055 A | 8/2017 |
| KR | 10-2017-0099435 A | 9/2017 |
| TW | M542780 U | 6/2017 |
| WO | WO 2015/001519 A2 | 1/2015 |

OTHER PUBLICATIONS

Chinese Office Action dated Nov. 26, 2020 issued in the corresponding Chinese Patent Application No. 201910387895.1. (9 pages in English)(9 pages in Chinese).

Indian Office Action dated Feb. 18, 2021 in counterpart Indian Patent Application No. 201914011778. (5 pages in English, 2 pages in Hindi).

Chinese Office Action dated Jul. 19, 2021 issued in counterpart Chinese Patent Application No. 201910387895.1 (9 pages in English; 10 pages in Chinese).

* cited by examiner

STOP MODULE AND CAMERA MODULE INCLUDING THE SAME

CROSS-REFERENCE TO RELATED APPLICATIONS

This application claims the benefit under 35 USC 119(a) of Korean Patent Application No. 10-2018-0053688 filed on May 10, 2018 and Korean Patent Application No. 10-2018-0091352 filed on Aug. 6, 2018 in the Korean Intellectual Property Office, the entire disclosures of which are incorporated herein by reference for all purposes.

BACKGROUND

1. Field

The following description relates to a stop module and a camera module including the same.

2. Description of Background

Camera modules have been standardly installed in portable electronic devices such as tablet personal computers (PCs), notebook computers, and the like, as well as smartphones. A general digital camera includes a mechanical stop to alter an amount of incident light, depending on an image capturing environment, but it may be difficult for a camera module used in a small product, such as the portable electronic device, to separately include a stop, due to structural characteristics and spatial limitations.

A weight of the camera module may be increased due to several components for driving the stop, such that an autofocusing function or an optical image stabilization function may be deteriorated. In addition, when the stop itself includes a power supply connecting part, such as a coil or the like for driving the stop, a problem may occur in that the power supply connecting part may be caught by upward and downward movement of a lens during the autofocusing.

In addition, since a stop module having various apertures needs to be installed in a small space, an accurate aperture may not be implemented due to space limitations.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a stop module includes a base; blades sequentially overlapping each other on the base to rotate about separate rotation shafts to form incident holes having different sizes; and a driving portion including a magnet portion. One of the blades is a driving blade, which is directly interlocked with the magnet portion, and the blades other than the driving blade are driven to be directly or indirectly interlocked with the driving blade.

The separate rotation shafts of the blades may be connected to each other to form a regular polygon.

A center of gravity of the regular polygon formed by the connection of the separate rotation shafts of the blades may substantially coincide with an optical axis.

Rotation angles of the blades may be substantially the same.

Each of the blades may include an opening of a same size and a same shape, and the openings may be overlapped to form the incident holes having different sizes.

At least a portion of the openings may be a portion of a regular N-polygon, where N is natural number.

Positions of the openings may be formed so that a circle having a position spaced apart from the rotation shaft of any one of the blades by a distance L between the rotation shaft and an optical axis in an opposite direction of the optical axis as the center, and having a distance 2L between the center and the optical axis as a radius is in contact with any one of vertices of the openings having at least a portion of the regular N-polygon.

The openings may be regular N-polygons.

A portion of the openings may be an arc of a circle, and a remainder of the openings may be a portion of the regular N-polygon.

There may be three blades.

The incident holes may all have a circular shape or a regular N-polygon shape.

The stop module may include a position sensor disposed to face a magnet of the magnet portion to sense a position of the magnet portion.

Each of the openings may have a shape in which at least two circular holes of different sizes are connected to each other.

The circular holes may include a large diameter and at least one small diameter having a radius smaller than a radius of the large diameter, the large diameter may be a same size as a size of an incident hole having a largest size, the at least one small diameter may be a circle having a center on a straight line connecting matched points and an optical axis to each other and having a radius r, and the matched points may be points at which a circle having a position spaced apart from the rotation shaft of any one of the blades by a distance L between the rotation shaft and the optical axis in an opposite direction of the optical axis as the center, and having a distance 2L between the center and the optical axis as a radius is in contact with the openings.

The magnet portion may be linearly moved in a direction approximately perpendicular to an optical axis direction.

In another general aspect, a stop module includes: a base; and blades sequentially overlapping each other on the base and to rotate about separate rotation shafts to form incident holes having different sizes. Each of the blades includes an opening, and at least a portion of the openings have a portion of a regular N-polygon, where N is a natural number. Positions of the openings are formed so that a circle having a position spaced apart from the rotation shaft of any one of the blades by a distance L between the rotation shaft and an optical axis in an opposite direction of the optical axis as the center, and having a distance 2L between the center and the optical axis as a radius is in contact with any one of vertices of the openings having at least a portion of the regular N-polygon.

In another general aspect, a camera module includes: a lens module accommodated in a housing; and the stop module to continuously form the incident holes of different sizes. The stop module includes a magnet portion interlocked with the blades to provide driving force and a coil provided in the lens module disposed to face the magnet portion.

In another general aspect, a camera module includes: a lens module; overlapping blades to form incident holes of different sizes to selectively change an amount of light incident on the lens module; and a magnet portion configured to move along a driving path in a direction perpendicular to an optical axis to rotate the blades to form the incident holes.

In a case in which the magnet portion is moved to a first end of the driving path, the blades may be rotated to form an incident hole having a smallest size among the incident holes, and in a case in which the magnet portion is moved to a second end of the driving path, the blades may be rotated to form an incident hole having a largest size among the incident holes.

The magnet portion may include a driving protrusion to fit into a guide hole of one blade among the blades, and the magnet portion may rotate the one blade a rotational amount proportional to an amount of movement of the magnet portion along the driving path.

The guide hole may be curved.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
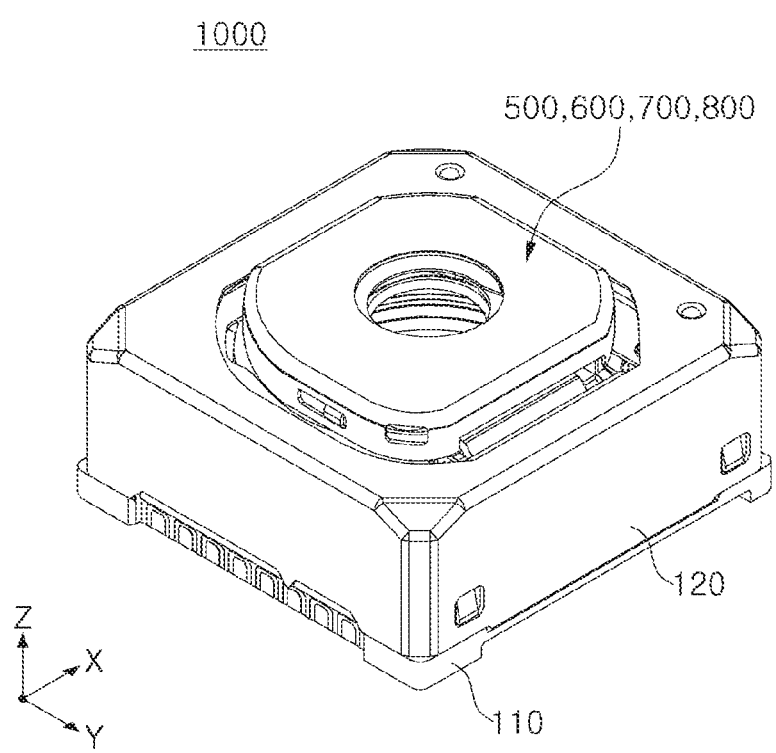
FIG. 1 is a perspective view illustrating a camera module according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Hereinafter, examples will be described in detail with reference to the accompanying drawings.

A camera module may be mounted in a portable electronic device such as a mobile communications terminal, a smartphone, a tablet personal computer (PC), or the like.

Figure 2:
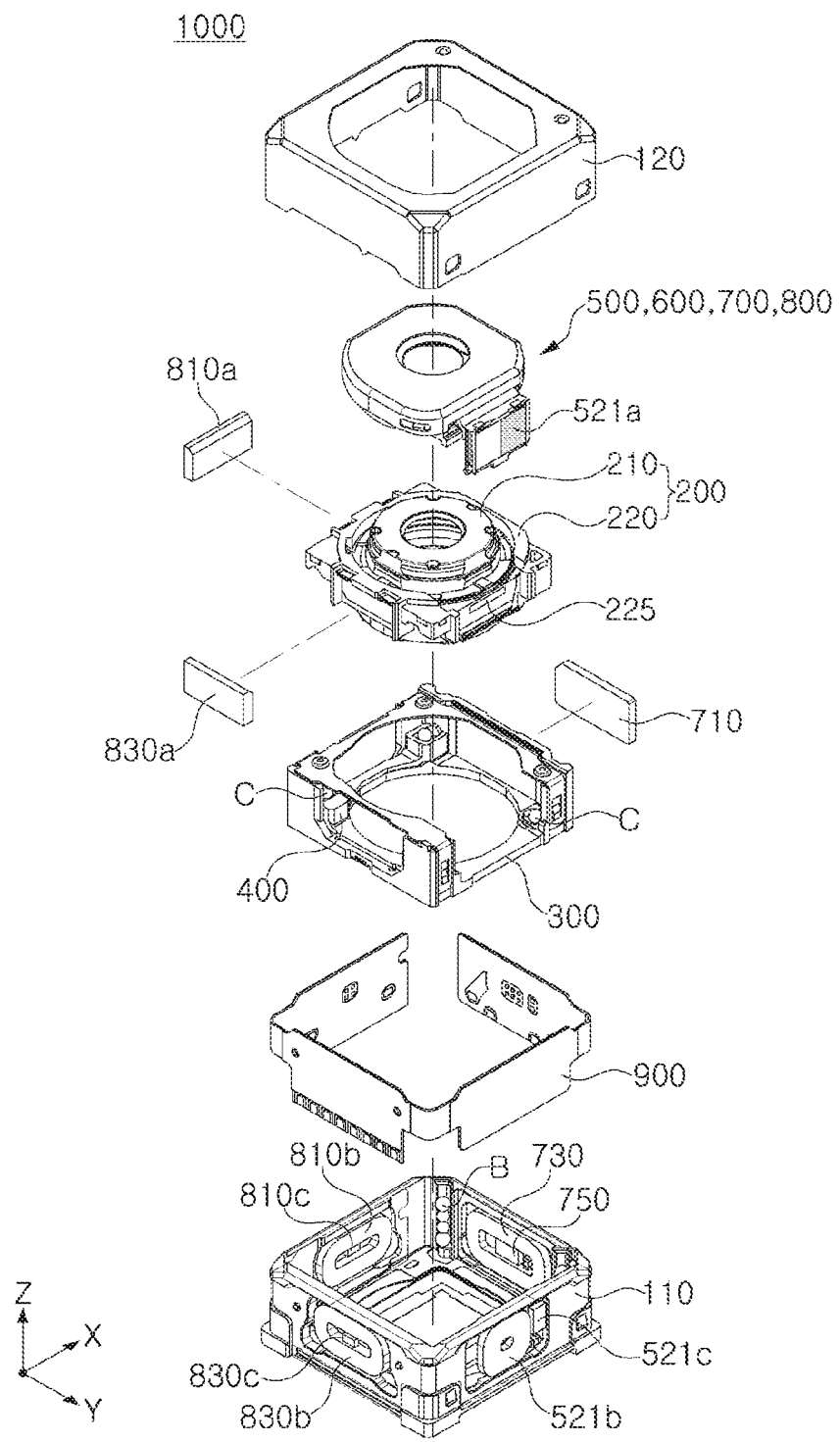
FIG. 2 is an exploded perspective view illustrating a camera module according to an example.
Figure 3A:
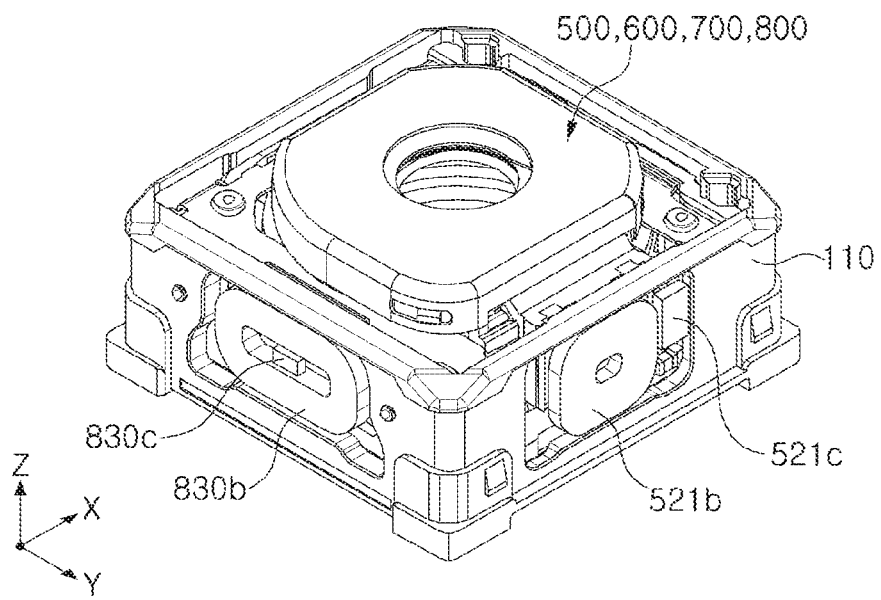
FIG. 3A is a partially cutaway perspective view of a camera module according to an example.
Figure 3B:
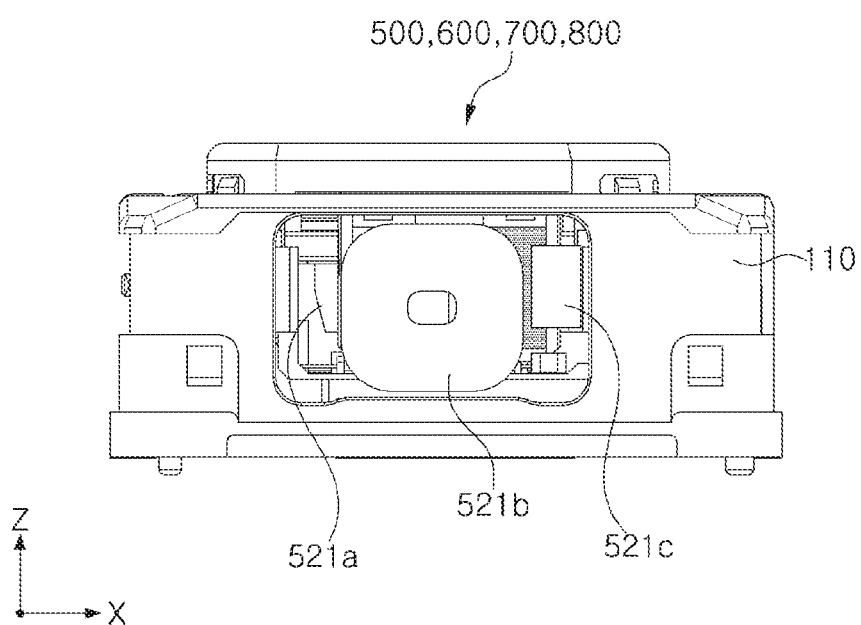
FIG. 3B is a side view of the camera module illustrated in FIG. 3A.

FIG. 1 is a perspective view illustrating a camera module according to an example, and FIG. 2 is an exploded perspective view illustrating a camera module according to an example. In addition, FIG. 3A is a partially cutaway perspective view of a camera module according to an example and FIG. 3B is a side view of the camera module in FIG. 3A.

Referring to FIGS. 1 through 3B, a camera module 1000 may include a lens module 200, a carrier 300, a guide portion 400, stop modules 500, 600, 700, and 800, a housing 110, and a case 120.

The lens module 200 may include a lens barrel 210 including a plurality of lenses that captures a subject, and a holder 220 that accommodates the lens barrel 210. The plurality of lenses may be disposed in the lens barrel 210 along an optical axis. The lens module 200 may be accommodated in the carrier 300.

The lens module 200 may be moved in an optical axis direction, along the optical axis, for focusing. As an example, the lens module 200 may be moved in the optical axis direction together with the carrier 300 by a focusing portion.

The focusing portion may include a magnet 710 and a coil 730 that generate a driving force in the optical axis direction. Further, the camera module 1000 may include a position sensor 750, for example, a hall sensor, to sense a position of the lens module 200, and the carrier 300, in the optical axis direction.

The magnet 710 may be mounted on the carrier 300. As an example, the magnet 710 may be mounted on one surface of the carrier 300.

The coil 730 and the position sensor 750 may be mounted on the housing 110. As an example, the coil 730 and the position sensor 750 may be fixed to the housing 110 so as to face the magnet 710. The coil 730 and the position sensor 750 may be provided onto a substrate 900, and the substrate 900 may be mounted on the housing 110.

The magnet 710 may be a moving member mounted on the carrier 300 and moved in the optical axis direction together with the carrier 300, and the coil 730 and the position sensor 750 may be fixed members which are fixed to the housing 110.

When a power is applied to the coil 730, the carrier 300 may be moved in the optical axis direction by electromagnetic interaction between the magnet 710 and the coil 730. The position sensor 750 may sense the position of the carrier 300 in the optical axis direction.

Since the lens module 200 is accommodated in the carrier 300, the lens module 200 may also be moved in the optical axis direction together with the carrier 300 by the movement of the carrier 300.

Rolling members B may be disposed between the carrier 300 and the housing 110 to reduce friction between the carrier 300 and the housing 110 when the carrier 300 is moved. The rolling members B may have a ball form.

The rolling members B may be disposed at both sides of the magnet 710 (or the coil 730).

A yoke may be mounted on the substrate 900. As an example, the yoke and the magnet 710 may be disposed to face each other while having the coil 730 interposed between the magnet 710 and the yoke.

Attractive force may act in a direction perpendicular to the optical axis direction between the yoke and the magnet 710.

The rolling members B may be maintained in a state in which they are in contact with the carrier 300 and the housing 110 by the attractive force between the yoke and the magnet 710.

The yoke may also serve to focus magnetic force of the magnet 710. Therefore, generation of a leakage magnetic flux may be prevented.

As an example, the yoke and the magnet 710 may form a magnetic circuit.

In order to correct a shake of an image due to factors such as a handshake of a user, the lens module 200 may be moved in a first direction (X axis) perpendicular to an optical axis (Z axis), and a second direction (Y axis) perpendicular to the optical axis and the first direction.

For example, when the shake is generated at the time of capturing the image due to the handshake of the user, or the like, a shake correcting portion may compensate for the shake by allowing the lens module 200 to be relatively displaced to correspond to the shake.

The guide portion 400 may be accommodated in the carrier 300 and may be mounted on an upper portion of the carrier 300 in the optical axis direction. In addition, the holder 220 may be mounted on the guide portion 400. Ball members C serving as rolling bearings may be provided between the carrier 300 and the guide portion 400 in the optical axis direction, and between the guide portion 400 and the holder 220 in the optical axis direction.

When the lens module 200 is moved in the first direction and the second direction that are perpendicular to the optical axis, the guide portion 400 may guide the lens module 200.

As an example, the lens module 200 may relatively move in the first direction in relation to the guide portion 400, and the guide portion 400 and the lens module 200 may be moved together in the second direction within the carrier 300.

The shake correcting portion may include a plurality of magnets 810a and 830a and a plurality of coils 810b and 830b that generate a driving force for shake correction. The shake correcting portion may include a plurality of position sensors 810c and 830c to sense positions of the lens module 200 in the first direction and the second direction. The position sensors 810C and 830C may be hall sensors.

Among the magnets 810a and 830a and the coils 810b and 830b, one magnet 810a and one coil 810b may be disposed to face each other in the first direction to generate a driving force in the first direction, and the other magnet 830a and the other coil 830b may be disposed to face each other in the second direction to generate a driving force in the second direction.

The magnets 810a and 830a may be mounted on the lens module 200, and the coils 810b and 830b and the position sensors 810c and 830c facing the magnets 810a and 830a may be fixed to the housing 110. As an example, the coils 810b and 830b and the position sensors 810c and 830c may be provided on the substrate 900 and the substrate 900 may be mounted on the housing 110.

The magnets 810a and 830a may be moving members moved in the first direction and the second direction together with the lens module 200, and the coils 810b and 830b and the position sensors 810c and 830c may be fixed members fixed to the housing 110.

Ball members C that support the guide portion 400 and the lens module 200 may be provided. The ball members C may serve to guide the guide portion 400 and the lens module 200 in a process of correcting the shake.

The ball members C may be provided between the carrier 300 and the guide portion 400, between the carrier 300 and the lens module 200, and between the guide portion 400 and the lens module 200.

When the driving force in the first direction is generated, the ball members C disposed between the carrier 300 and the guide portion 400, and between the carrier 300 and the lens module 200 may roll in the first direction. Therefore, the ball members C may guide the movement of the guide portion 400 and the lens module 200 in the first direction.

When the driving force in the second direction is generated, the ball members C disposed between the guide portion 400 and the lens module 200, and between the carrier 300 and the lens module 200 may roll in the second direction. Therefore, the ball members C may guide the movement of the lens module 200 in the second direction.

The lens module 200 and the carrier 300 may be accommodated in the housing 110. As an example, the housing 110 may have a shape in which the top and the bottom are opened, and the lens module 200 and the carrier 300 may be accommodated in an internal space of the housing 110.

A printed circuit board on which the image sensor is mounted may be disposed below the housing 110.

The case 120 may be coupled to the housing 110 to surround outer surfaces of the housing 110, and may serve to protect internal components of the camera module 1000. The case 120 may serve to shield electromagnetic waves.

As an example, the case 120 may shield electromagnetic waves generated from the camera module so that the electromagnetic waves do not have an influence on other electronic components in the portable electronic device.

Since several electronic components as well as the camera module are mounted in the portable electronic device, the case 120 may shield electromagnetic waves generated from these electronic components so that the electromagnetic waves do not have an influence on the camera module.

The case 120 may be formed of a metal and be thus grounded to a ground pad provided on the printed circuit board, resulting in shielding the electromagnetic waves.

The stop modules 500, 600, 700, and 800 may be apparatuses configured to selectively change an amount of light incident on the lens module 200.

As an example, the stop modules 500, 600, 700, and 800 may be provided with a plurality of blades capable of implementing incident holes having different sizes. By implementing an incident hole of one size among the incident holes of a plurality of sizes using the plurality of blades depending on a capturing environment, an amount of incident light may be adjusted.

The stop modules 500, 600, 700, and 800 may be coupled to the lens module 200 and may selectively change the amount of light incident on the lens module 200.

Since the stop modules 500, 600, 700, and 800 may allow a relatively small amount of light to be incident on the lens module 200 in a high illumination environment and allow a relatively large amount of light to be incident on the lens module 200 in a low illumination environment, the stop modules may constantly maintain quality of an image even in various illumination conditions.

The stop modules 500, 600, 700, and 800 may be coupled to the lens module 200 to be moved in the optical axis direction (a Z axis direction), the first direction (an X axis direction), and the second direction (a Y axis direction) together with the lens module 200. That is, the lens module 200 and the stop modules 500, 600, 700, and 800 may be moved together during the focusing and shake correction such that a distance between the lens module 200 and the stop modules 500, 600, 700, and 800 are not changed.

FIGS. 4 through 7 are views illustrating the stop module 500 according to an example. The stop module 500 will be described in detail with reference to FIGS. 4 through 7.

Figure 4:
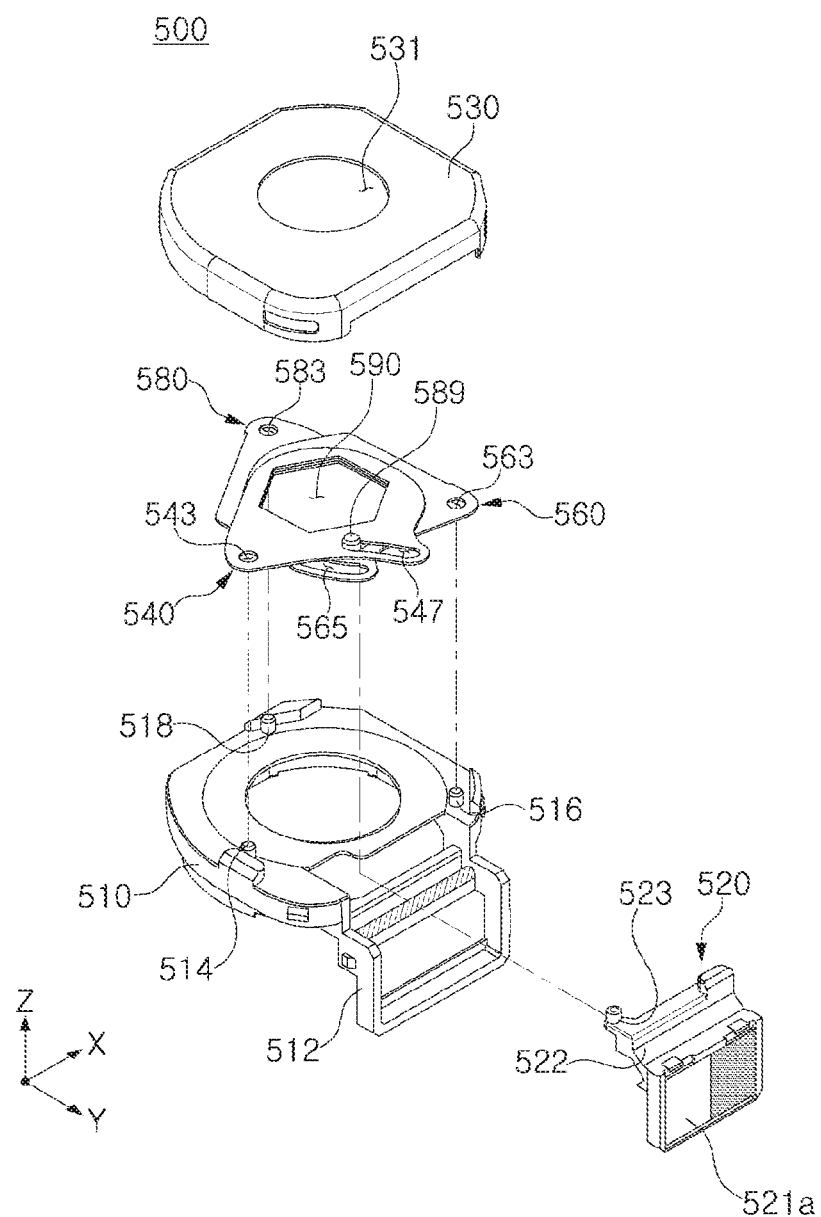
FIG. 4 is an exploded perspective view illustrating a stop module according to an example.

Referring to FIG. 4 (and FIGS. 3A and 3B), the stop module 500 may include a base 510, a first blade 540, a second blade 560, and a third blade 580, and a stop driving portion (including a magnet portion 520 and a coil 521b provided in the housing 110 of the camera module 1000). The stop module 500 may also include a cover 530 covering the base 510 and the first to third blades 540, 560, and 580 and including an opening 531 on which light is incident.

In the example of FIG. 4, three blades 540, 560, and 580 may be provided, and the blades 540, 560, and 580 may have openings in the shape of a circle or a regular polygon (regular N polygon and N is a natural number), or may have openings of a shape in which a circle and a regular polygon are joined to each other, or may have openings of a shape in which circles having different sizes are connected to each other.

The magnet portion 520 may reciprocate in a direction perpendicular to the optical axis (Z axis) by interacting with the coil 521b provided in the housing 110. As illustrated in the drawings, the magnet portion 520 may be moved in the first direction (X axis direction).

Referring to the drawings, for example, the magnet portion 520 may reciprocate in the X axis direction, and the first to third blades 540, 560 and 580 which are interlocked with the magnet portion 520 and provided to rotate about a first shaft protrusion 514, a second shaft protrusion 516, and a third shaft protrusion 518, respectively, may rotate to change the sizes of incident holes 590-591, 592, and 593.

The stop driving portion may include the magnet portion 520 disposed on the base 510 to be movable along one axis (the X axis in FIG. 4) perpendicular to the optical axis, and the coil 521b fixed to the housing 110 to face the magnet portion 520.

The coil 521b may be provided to the substrate 900, and the substrate 900 may be fixed to the housing 110. The substrate 900 may be electrically connected to a printed circuit board attached to a bottom of the camera module 1000.

When the magnet portion 520 is linearly moved, a closed loop control method of sensing and feeding back a position of the magnet portion 520 may be used. Therefore, a position sensor 521c may be provided for closed loop control. The position sensor 521c may be installed adjacent to the center or side of the coil 521b to face a magnet 521a. The position sensor 521c may be installed on the substrate 900.

The magnet portion 520 may be a moving member moving in the optical axis direction, the first direction, and the second direction together with the base 510, and the coil 521b may be a fixed member fixed to the housing 110.

Since the coil 521b providing the driving force to the stop module 500 is disposed outside the stop module 500, that is, on the housing 110 of the camera module, a weight of the stop module 500 may be reduced.

In other words, since the coil 521b providing the driving force to the stop module 500 is provided as the fixed member, the coil 521b may not be moved at the time of driving an autofocusing or optical image stabilization, thereby significantly reducing an increase in a weight of the lens module 200 due to the use of the stop module 500.

In addition, since the coil 521b providing the driving force to the stop module 500 is disposed on the housing 110, which is a fixed member, and is electrically connected to a printed circuit board, even though the lens module 200 and the stop module 500 are moved at the time of performing the autofocusing and optical image stabilization, the movement of the lens module 200 and the stop module 500 may not have an influence on the coil 521b of the stop driving portion.

Therefore, deterioration of an autofocusing function may be prevented.

The base 510 may be provided with a movement guide portion 512 on which the magnet portion 520 is disposed. The movement guide portion 512 may be extended in the optical axis direction from the base 510 and may be provided to face the lens module 200.

The magnet portion 520 may include a magnet 521a disposed to face the coil 521b and a magnet holder 522 to which the magnet 521a is attached. The magnet 521a may be provided to face the coil 521b in a direction perpendicular to the optical axis direction.

The magnet portion 520 may be coupled to the movement guide portion 512 of the base 510. The holder 220 of the lens module 200 may include a yoke 225 (referring back to FIG. 2) provided at a position facing the magnet portion 520. The magnet portion 520 may be slid while maintaining a state in which the magnet portion 520 is in close contact with the movement guide portion 512 by attraction force between the yoke 225 and the magnet 521a. A yoke (not illustrated) may also be included in the base 510. For example, a yoke (not illustrated) may be included to face the magnet portion 520 in the base 510 or the movement guide portion 512 protruding from the base 510, and the magnet portion 520 may be supported to be close in contact with the movement guide portion 512 by attraction force between the magnet 521a included in the magnet portion 520 and the yoke (not illustrated). The yoke may be included in the lens module 200 or the base 510, and although not illustrated in detail, yokes of various structures in Korean Patent Laid-Open Publication No. 10-2018-0074710 filed by Samsung Electro-Mechanics Co., Ltd., the same applicant as the present application may be applied thereto.

The magnet portion 520 may be moved in a direction perpendicular to the optical axis direction, and overlapping positions of a first opening 541, a second opening 561, and a third opening 581 provided in the first to third blades 540, 560, and 580 are changed by the rotation of the first to third blades 540, 560, and 580, thereby changing the size of the incident hole 590. Therefore, when the magnet portion 520 is moved to an end portion of one side of the movement guide portion 512 in the direction perpendicular to the optical axis direction, the size of the incident hole may be changed to be larger or smaller.

The first to third blades 540, 560 and 580 may be sequentially stacked on the base 510 to overlap each other in the optical axis direction, for example, the first blade 540, the second blade 560, and the third blade 580 are sequentially stacked from the object side to the image side, and first to third shaft protrusions 514, 516, and 518 which are inserted into a first hole 543, a second hole 563, and a third hole 583 of the first to third blades 540, 560, and 580, respectively, may be provided on an upper surface of the base 510. The first to third blades 540, 560, and 580 may rotate about the first to third shaft protrusions 514, 516, and 518. Therefore, the overlapping positions of the first to third openings 541, 561, and 581 of the first to third blades 540, 560, and 580 may be changed and the size of the incident hole may be changed.

The magnet portion 520 may be interlocked with the first to third blades 540, 560, and 580 to provide driving force by which the first to third blades 540, 560, and 580 may rotate about the first to third shaft protrusions 514, 516, and 518.

The magnet holder 522 of the magnet portion 520 may be provided with a first driving protrusion 523 fitted into a guide hole elongated in one direction in any one of the first to third blades 540, 560, and 580. The remaining blades which are not directly connected to the first driving protrusion 523 may be directly or indirectly interlocked with the blade which is directly interlocked with the first driving protrusion 523, such that the first to third blades 540, 560, and 580 may rotate to be interlocked with each other along a motion of the magnet portion 520.

As an example, the first driving protrusion 523 may be fitted into a first guide hole 565 of the second blade 560, which is located at the middle in the optical axis direction among the three blades, such that the second blade 560 may be rotated about the second shaft protrusion 516 as the center shaft along the movement of the magnet portion 520. A second driving protrusion 589 provided in the third blade 580 may be fitted into a second guide hole 567 of the second blade 560, such that the third blade 580 may also be rotated about the third shaft protrusion 518 as the center shaft when the second blade 560 rotates. Further, the second driving protrusion 589 of the third blade 580 may be fitted into a third guide hole 547 of the first blade 540, such that the first blade 540 may be rotated about the first shaft protrusion 514 as the center shaft. As a result, the first to third blades 540, 560, and 580 may rotate about the first to third shaft protrusions 514, 516, and 518, respectively, as the center shaft thereof. This is merely an example, and a design may be variously changed. For example, the guide hole which is directly connected to the first driving protrusion 523 of the magnet portion 520 may be provided in the first or second blade, and the second driving protrusion may also be provided in the first or second blade.

The first to third shaft protrusions 514, 516, and 518 and the first to third holes 543, 563, and 583 into which the first to third shaft protrusions 514, 516, and 518 are inserted may have a round cross section, and it may be desirable to significantly reduce a tolerance of the protrusion and the hole so that only the rotation of the blade is possible after the protrusion is inserted into the hole.

The first to third guide holes 565, 567, and 547 into which the first or second driving protrusion 523 or 589 is fitted need to allow the first to third blades 540, 560, and 580 to be rotated along the movement of the first or second driving protrusion 523 or 589, the first to third guide holes 565, 567, and 547 may be elongated in one direction. Since the first guide hole 565 needs to allow the rotation along the movement of the magnet portion 520, the first guide hole 565 may be elongated in a direction inclined with the movement direction of the magnet portion 520, that is, the first driving protrusion 523. Further, since the second guide hole 567 and the third guide hole 547 are fitted with the second driving protrusion 589 to be rotated, the second guide hole 567 and the third guide hole 547 may be elongated in a direction inclined with the movement direction of the second driving protrusion 589.

The first to third guide holes 565, 567, and 547 may be straight lines or curves elongated in one direction. In a case in which the first to third guide holes 565, 567, and 547 are straight lines or curves elongated in one direction, the first to third guide holes 565, 567, and 547 may have the same curvature as that of an arc of a predetermined circle.

The first guide hole 565 may be directly connected to the magnet portion 520 that reciprocates in one direction (the X axis direction) and the first driving protrusion 523 of the magnet portion 520 may be linearly moved. Therefore, when the first guide hole 565 is a curve elongated in one direction, an amount of rotation (rotation angle) of the second blade 560 may be approximately proportional to an amount of movement of the magnet portion 520. When the first guide hole 565 is a straight line, since an entry angle (an angle formed by an inner wall of the guide hole and an advancing direction of the driving protrusion when the driving protrusion moves and pushes the inner wall of the guide hole) is changed from time to time depending on the position of the first guide hole 565, the amount of rotation (rotation angle) of the second blade 560 may not be proportional to the amount of movement of the magnet portion 520. Therefore, when the first guide hole 565 is a curve type, a control of the driving portion may be simpler.

Since third blade 580 rotating about the third shaft protrusion 518 as the rotation shaft is fitted into the second and third guide holes 567 and 547, the third blade 580 may rotate along the rotation of the second blade 560 and the first blade 540 may rotate in conjunction with the rotation of the third blade 580.

In a case in which the second and third guide holes 567 and 547 are the curve types, since the second driving protrusion 589 which rotates and the inner wall of the second and third guide holes 567 and 547 of the curve type push each other, a design may be made so that the entry angle is always constant (particularly, when the second and third guide holes 567 and 547 have an arc shape of a predetermined circle). Therefore, the force consumed when the second driving protrusion 589 rotates in one direction or the other direction opposite to one direction may be substantially the same. Therefore, when the second and third guide holes 547 and 567 are the curve type, the control of the driving portion may be simpler.

The first to third blades 540, 560, and 580 may be provided with the first to third openings 541, 561, and 581, respectively. In addition, since the first to third blades 540, 560, and 580 slide in a state in which they are in contact with each other, antistatic treatment may be applied to the first to third blades 540, 560, and 580 so as not to generate friction electricity.

The center of the incident hole formed by the first to third openings 541, 561, and 581 of the first to third blades 540, 560, and 580 may coincide with the optical axis. That is, the first to third blades 540, 560, and 580 may be driven to rotate about the first to third shaft protrusions 514, 516, and 518, respectively, as the center shaft, and the first to third blades 540, 560, and 580 may be coupled to the base 510 so that the center of the incident hole formed by overlapping the first to third openings 541, 561, and, 581 provided in the first to third blades 540, 560, and 580 along the rotation driving of the first to third blades 540, 560, and 580 are substantially coincident with the optical axis.

The first to third shaft protrusions 514, 516, and 518 may be positioned to correspond to vertices of an equilateral triangle, respectively. Therefore, the center of the triangle formed by the first to third shaft protrusions 514, 516, and 518 may substantially coincide with the optical axis.

The first to third openings 541, 561, and 581 of the first to third blades 540, 560, and 580 may have a regular hexagonal shape. Therefore, the incident hole formed by the first to third openings 541, 561, and 581 overlapping each other along the rotation of the first to third blades 540, 560, and 580 may have a hexagonal shape or a regular hexagonal shape.

Here, the incident hole formed by the plurality of blades overlapping each other may be a regular N-polygon. In this case, as a first example, the number of the plurality of blades may be N or N/2, and the blade may be provided with at least one or two straight line portions on an inner side thereof in the form of a boomerang without an opening. As another example, the number of the plurality of blades may be N or N/2, and the plurality of blades may be the regular N polygon in which the plurality of openings provided in therein have the same size.

The first to third blades 540, 560, and 580 may be coupled to the base 510 so that at least a portion thereof overlaps with each other in the optical axis direction, and may be movable by the stop driving portion. As an example, the first to third blades 540, 560, and 580 may be rotationally movable in the same direction along the movement of the magnet portion 520 in one direction. Therefore, in a case in which the size of the incident hole increases when the magnet portion 520 moves in one direction, the size of the incident hole may be reduced when the magnet portion 520 moves in the other direction opposite to one direction.

Portions of the first to third openings 541, 561, and 581 may overlap with each other in the optical axis direction. The portions of the first to third openings 541, 561, and 581 may overlap with each other in the optical axis direction to form an incident hole through which light passes.

At least portions of the first to third openings 541, 561, and 581 may overlap with each other to form a plurality of incident holes having different diameters. As an example, all of the first to third openings 541, 561, and 581 may overlap with each other to form an incident hole having a relatively large diameter, and the portions of the first to third openings 541, 561, and 581 may overlap with each other to form an incident hole having a relatively small diameter. The incident hole may have a circular shape or a polygonal shape depending on the shapes of the first to third openings 541, 561, and 581.

Therefore, depending on a capturing environment, the light may be incident through any one of the plurality of incident holes.

Figure 5A:
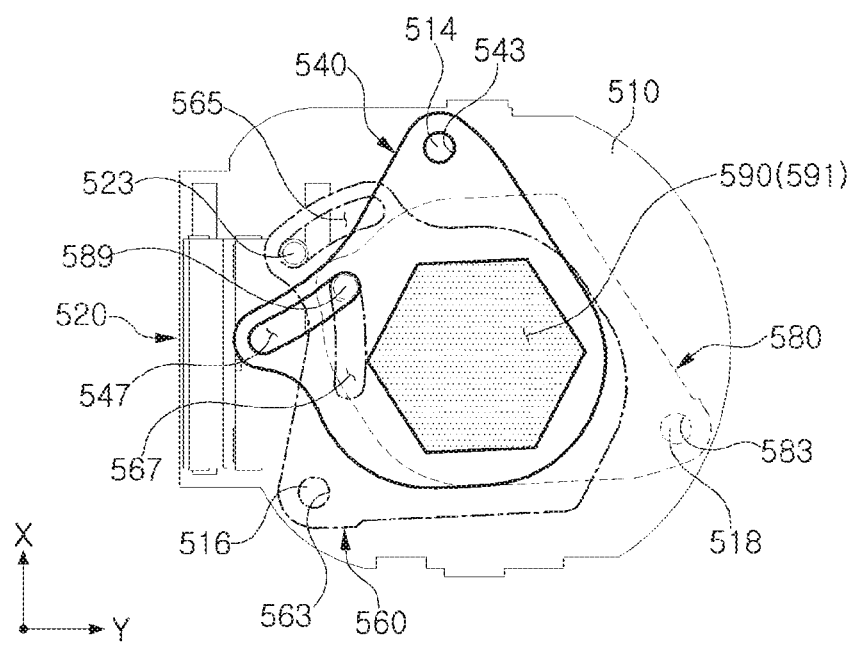
FIGS. 5A, 5B, and 5C are plan views illustrating a form in which a stop module is driven to change a diameter of an incident hole.
Figure 5B:
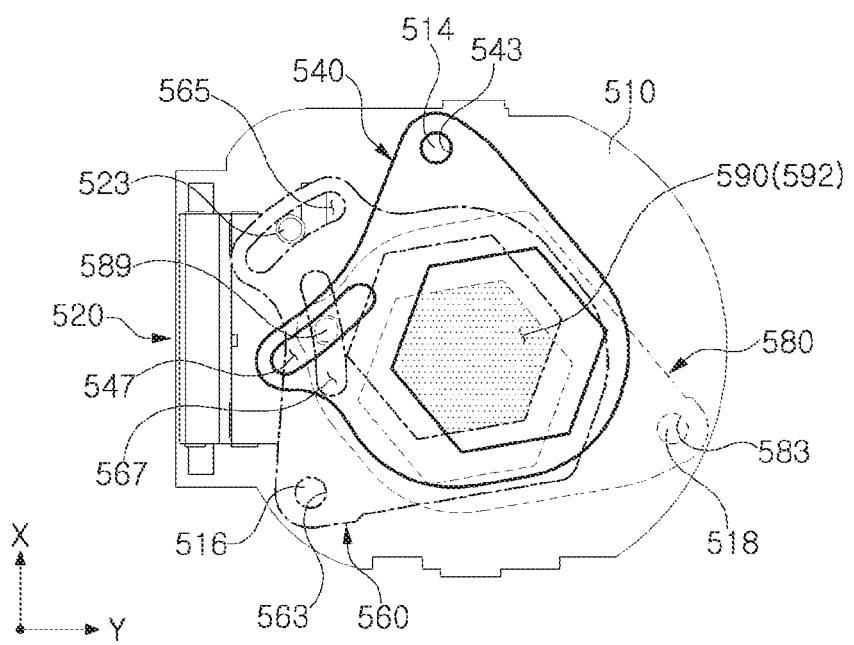
Figure 5C:
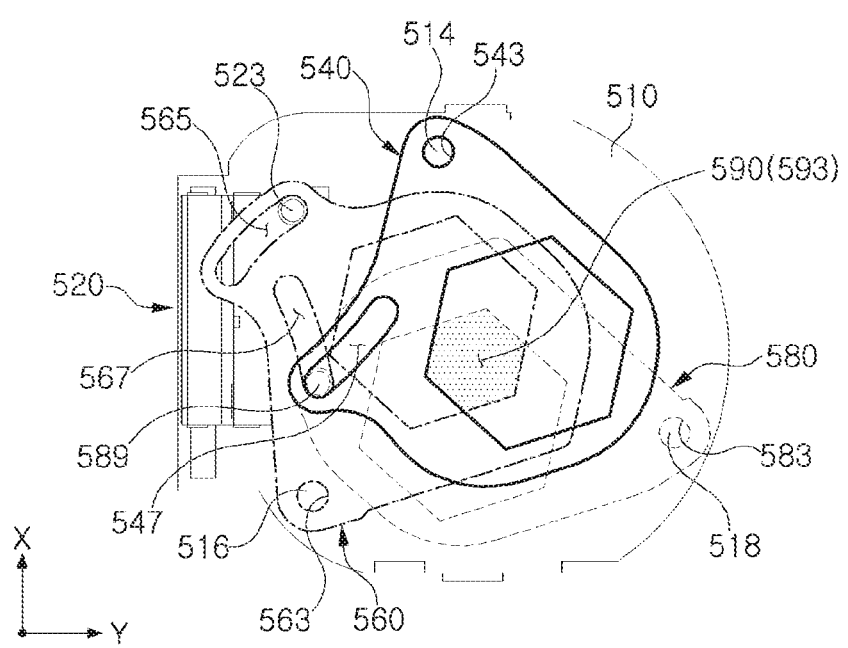
Figure 6:
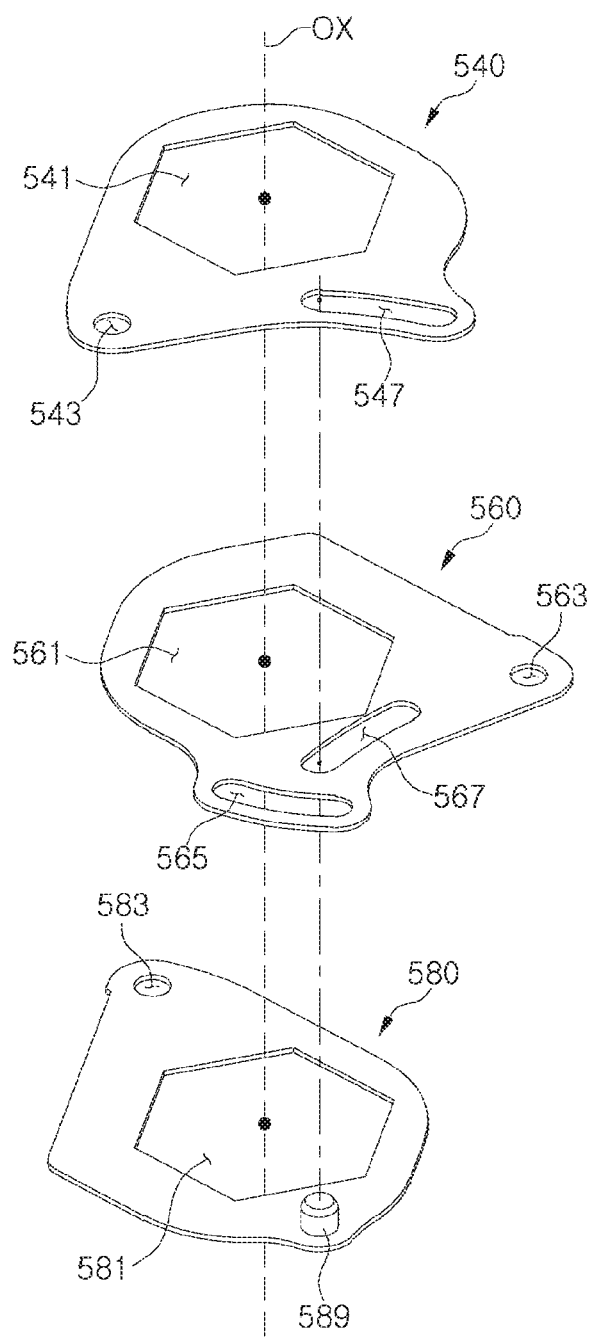
FIG. 6 is an exploded perspective view illustrating blades provided in a stop module according to an example.

In FIGS. 5A through 5C, in order to distinguish the first to third blades, the first blade 540 is denoted by a solid line, the second blade 560 is denoted by a one-dot chain line, and the third blade 580 is denoted by a dotted line.

Referring to FIG. 5A, in a case in which the magnet portion 520 is positioned at an end portion of one side of the blades, the first to third openings 541, 561, and 581 of the first to third blades 540, 560, and 580 may be accurately overlapped with each other by the stop driving portion to form an incident hole 590-591 having the largest diameter.

Referring to FIG. 5B, in a case in which the magnet portion 520 is positioned between end portions of one side and the other side of the blade, the first to third blades 540, 560, and 580 may rotationally move about the first to third shaft protrusions 514, 516, and 518 as the shaft by the stop driving portion, and the first to third openings 541, 561, and 581 may partially overlap with each other to form an incident hole 590-592 having approximately a medium diameter.

Referring to FIG. 5C, in a case in which the magnet portion 520 is positioned at an end portion of the other side of the blade opposite to one side thereof, the first to third blades 540, 560, and 580 may rotationally move about the first to third shaft protrusions 514, 516, and 518 as the shaft by the stop driving portion, and the first to third openings 541, 561, and 581 may partially overlap with each other to form an incident hole 590-593 having the smallest diameter.

Although not illustrated, the magnet portion 520 may be moved to positions other than the positions illustrated in FIGS. 5A through 5C. Therefore, the stop module 500 according to the example may continuously implement incident holes having various sizes.

Although FIGS. 5A through 5C illustrate that the size of the incident hole is smaller or larger as the magnet portion 520 moves from the end portion of one side of the blade to the end portion of the other side thereof, the size of the incident hole may also be changed by other methods. For example, when the magnet portion 520 is approximately at the middle portion, the incident hole may have the largest size, when the magnet portion 520 moves to the end portion of one side of the blade, the incident hole having the smallest size may be implemented, and when the magnet portion 520 moves to the end portion of the other side of the blade, the incident hole having the medium size may be implemented.

Figure 7:
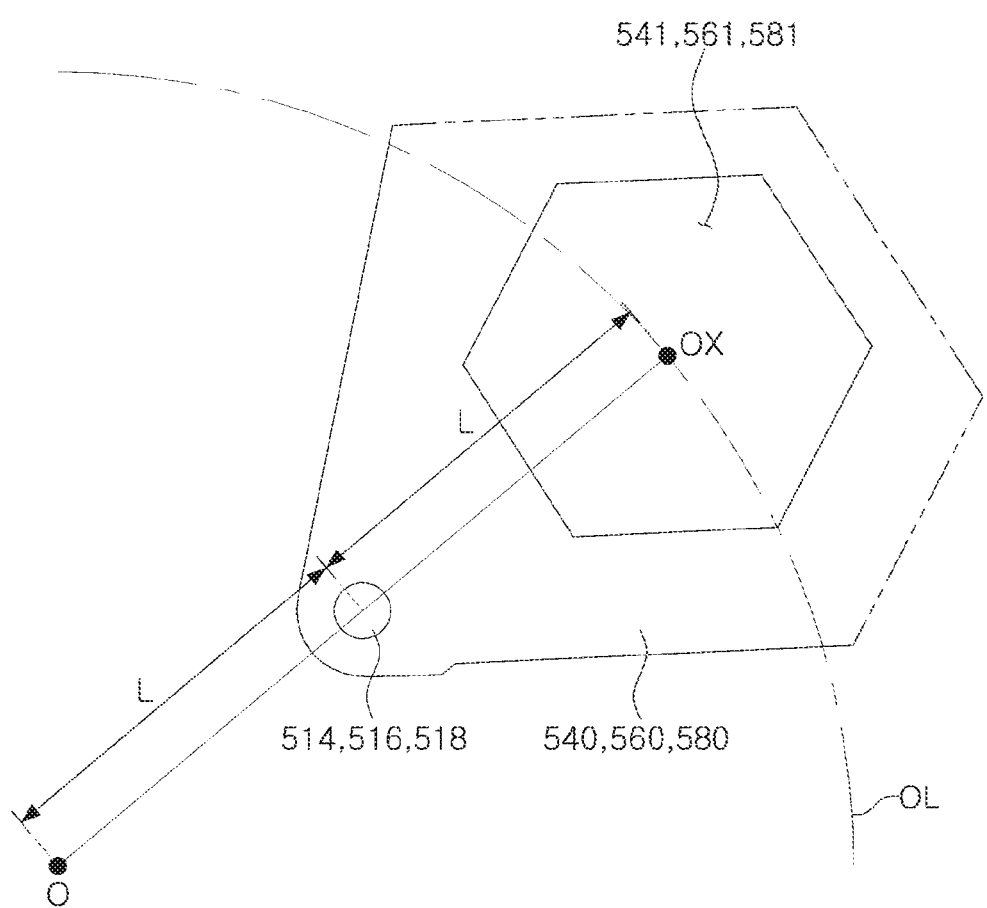
FIG. 7 is a view for describing a mechanism for specifying a position of an incident hole (opening) provided in the blades of a stop module according to an example.
Figure 8:
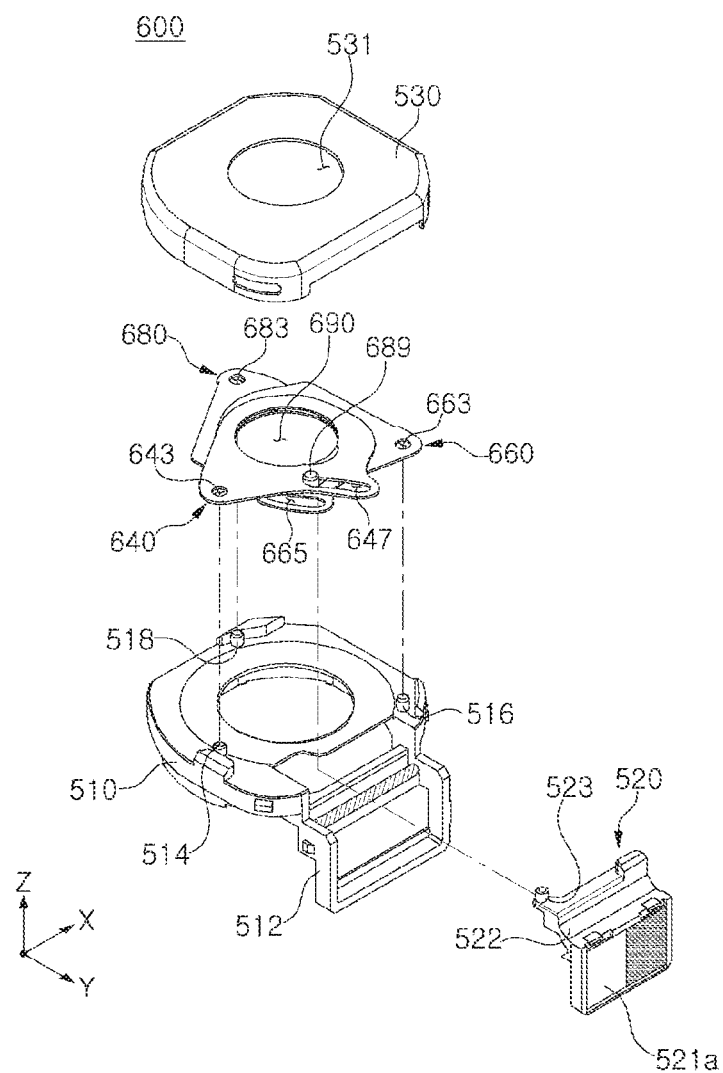
FIG. 8 is an exploded perspective view illustrating a stop module according to an example.

Referring to FIG. 7, the stop module 500 may continuously implement the incident holes of various sizes and allow the shape of the incident holes to be precisely square in all sizes. For example, as illustrated in FIGS. 5A through 5C, the stop module 500 may include the first to third openings 541, 561, and 581 of a regular hexagon, and may implement the incident holes of all sizes formed by the first to third openings 541, 561, and 581 as the regular hexahedron.

In a case in which it is assumed that the incident hole formed in a state in which the first to third blades 540, 560, and 580 overlap with each other by positioning the magnet portion 520 at the end portion of one side (FIG. 5A) has the largest size, and the positions of the first to third openings 541, 561, and 581 are designed so that a circle OL having a position spaced apart from the first to third shaft protrusions 514, 516, and 518, which are the rotation shaft of any one of the first to third blades 540, 560, and 580, by a distance L between the first to third shaft protrusions 514, 516, and 518 and the optical axis in an opposite direction of the optical axis OX as the center O and having a distance 2L between the center O and the optical axis as a radius is in contact with one vertex of the first to third openings 541, 561, and 581 of the regular hexagon (the center of the regular hexagon formed by the first to third openings 541, 561, and 581 always coincides with the optical axis OX), the incident holes of all sizes formed by the first to third openings 541, 561, and 581 overlapping each other may be implemented in the regular hexagon.

FIGS. 8 through 11 are views for describing a stop module according to other examples. Since a stop module 600 according to examples illustrated in FIGS. 8 through 11 has the same components as those of the stop module 500 described with reference to FIGS. 4 through 7 and has shapes of first to third openings provided in first to third blades which are different from those of the stop module 500, other components other than the first to third blades are denoted by the same reference numerals, the description of other components is replaced with that described with referent to FIGS. 4 through 7, and only the first to third blades will be described.

A first blade 640, a second blade 660, and a third blade 680 may be coupled to the base 510 so that at least a portion of each of the blades overlaps with each other in the optical axis direction, and may be movable by the stop driving portion. As an example, the first to third blades 640, 660, and 680 may be rotationally movable in the same direction along the movement of the magnet portion 520 in one direction. Therefore, in a case in which the size of the incident hole increases when the magnet portion 520 moves in one direction, the size of the incident hole may be reduced when the magnet portion 520 moves in the other direction opposite to one direction.

At least portions of a first opening 641, a second opening 661, and a third opening 681 may overlap with each other in the optical axis direction. The portions of the first to third openings 641, 661, and 681 may overlap with each other in the optical axis direction to form an incident hole through which light passes.

At least portions of the first to third openings 641, 661, and 681 may overlap with each other to form a plurality of incident holes having different diameters. As an example, all of the first to third openings 641, 661, and 681 may overlap with each other to form an incident hole having a relatively large diameter, and the portions of the first to third openings 641, 661, and 681 may overlap with each other to form an incident hole having a relatively small diameter. The incident hole may have a circular shape or a polygonal shape depending on the shapes of the first to third openings 641, 661, and 681.

Therefore, depending on a capturing environment, the light may be incident through any one of the plurality of incident holes.

Figure 9A:
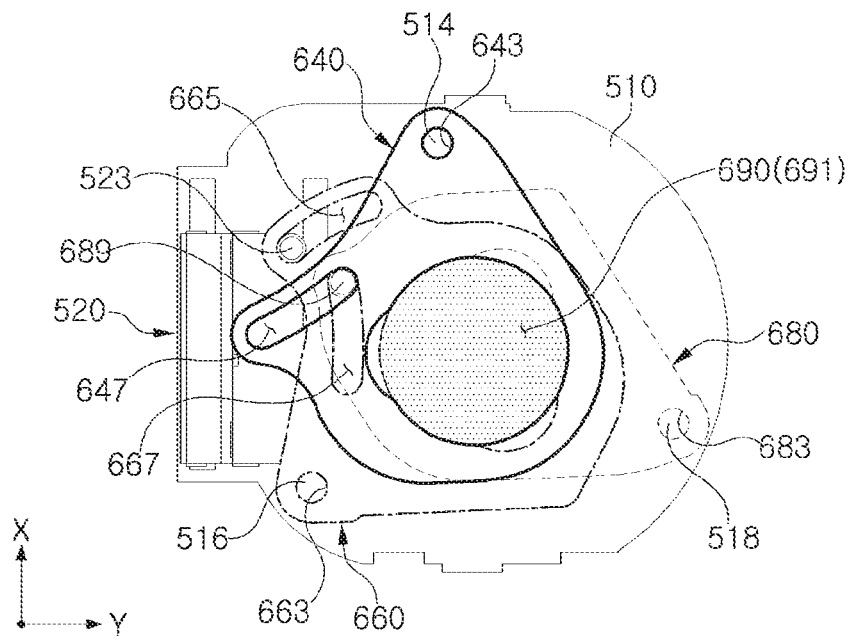
FIGS. 9A, 9B, and 9C are plan views illustrating a form in which the stop module is driven to change a diameter of an incident hole of the stop module illustrated in FIG. 8.

Referring to FIG. 9A, in a case in which the magnet portion 520 is positioned at an end portion of one side of the blades, the first to third openings 641, 661, and 681 of the first to third blades 640, 660, and 680 may be accurately overlapped with each other by the stop driving portion to form an incident hole 690-691 having the largest diameter.

Figure 9B:
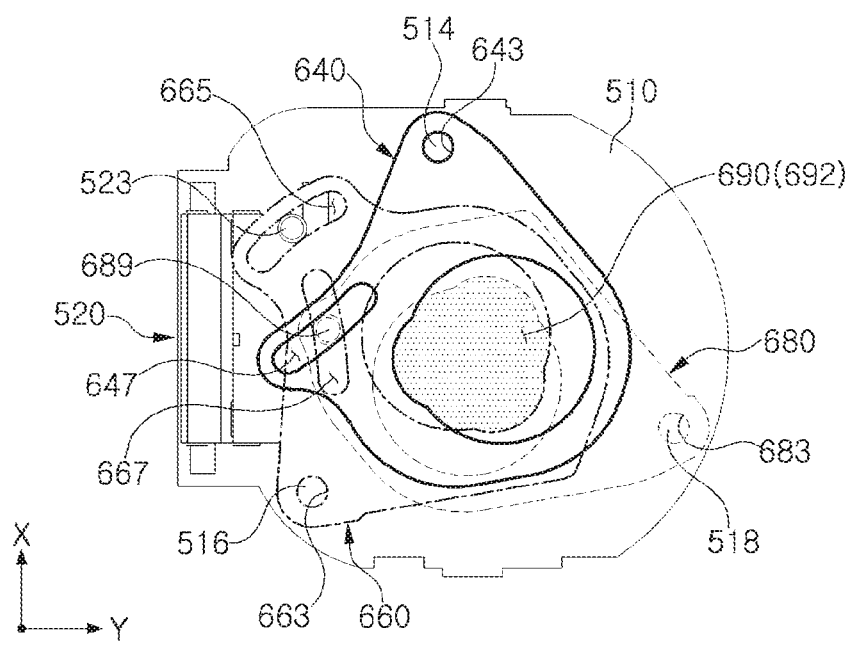

Referring to FIG. 9B, in a case in which the magnet portion 520 is positioned between end portions of one side and the other side of the blade, the first to third blades 640, 660, and 680 may rotationally move about the first to third shaft protrusions 514, 516, and 518 as the shaft by the stop driving portion, and the first to third openings 641, 661, and 681 may partially overlap with each other to form an incident hole 690-692 having approximately a medium diameter.

Figure 9C:
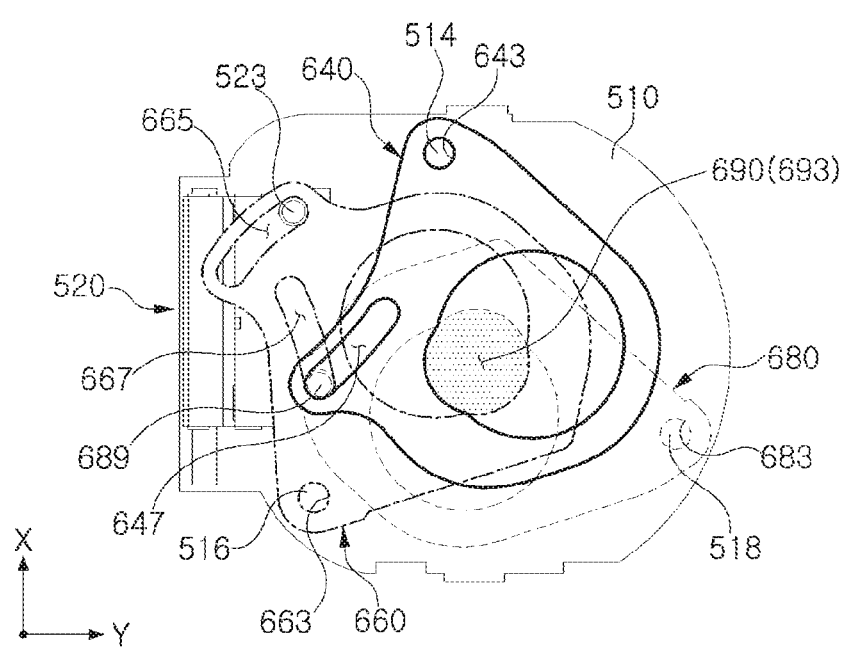
Figure 10:
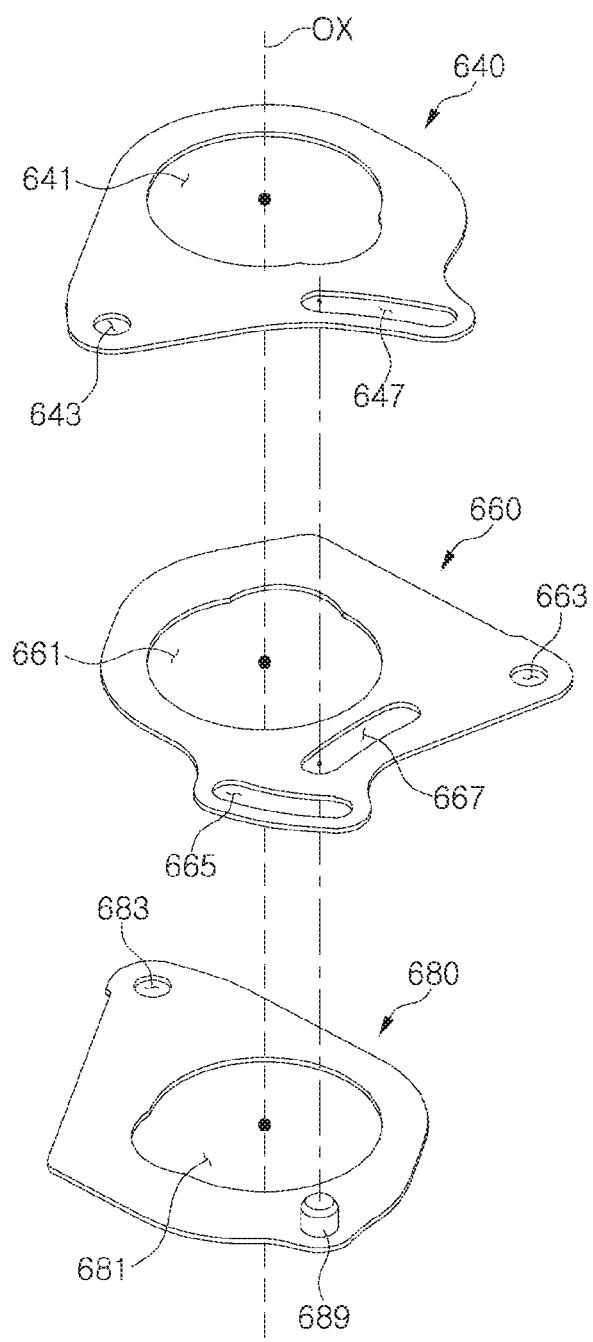
FIG. 10 is an exploded perspective view of blades provided in the stop module illustrated in FIG. 8.

Referring to FIG. 9C, in a case in which the magnet portion 520 is positioned at an end portion of the other side of the blade opposite to one side thereof, the first to third blades 640, 660, and 680 may rotationally move about the first to third shaft protrusions 514, 516, and 518 as the shaft by the stop driving portion, and the first to third openings 641, 661, and 681 may partially overlap with each other to form an incident hole 690-693 having the smallest diameter.

Although not illustrated, the magnet portion 520 may be moved to positions other than the positions illustrated in FIGS. 9A through 9C. Therefore, the stop module 600 according to the example may change the sizes of the incident holes in three stages or continuously implement incident holes having various sizes.

Although FIGS. 9A through 9C illustrate that the size of the incident hole is smaller or larger as the magnet portion 520 moves from the end portion of one side of the blade to the end portion of the other side thereof, the size of the incident hole may also be changed by other methods. For example, when the magnet portion 520 is approximately at the middle portion, the incident hole may have the largest size, when the magnet portion 520 moves to the end portion of one side of the blade, the incident hole having the smallest size may be implemented, and when the magnet portion 520 moves to the end portion of the other side of the blade, the incident hole having the medium size may be implemented.

Meanwhile, since first to third holes 643, 663, and 683 and first to third guide holes 665, 667, and 647 in the stop module 600 have the same shapes and functions as those of the first to third holes 543, 563, and 583 and the first to third guide holes 565, 567, and 547 of the stop module 500 of FIGS. 4 through 7, a detailed description thereof is omitted.

Figure 11:
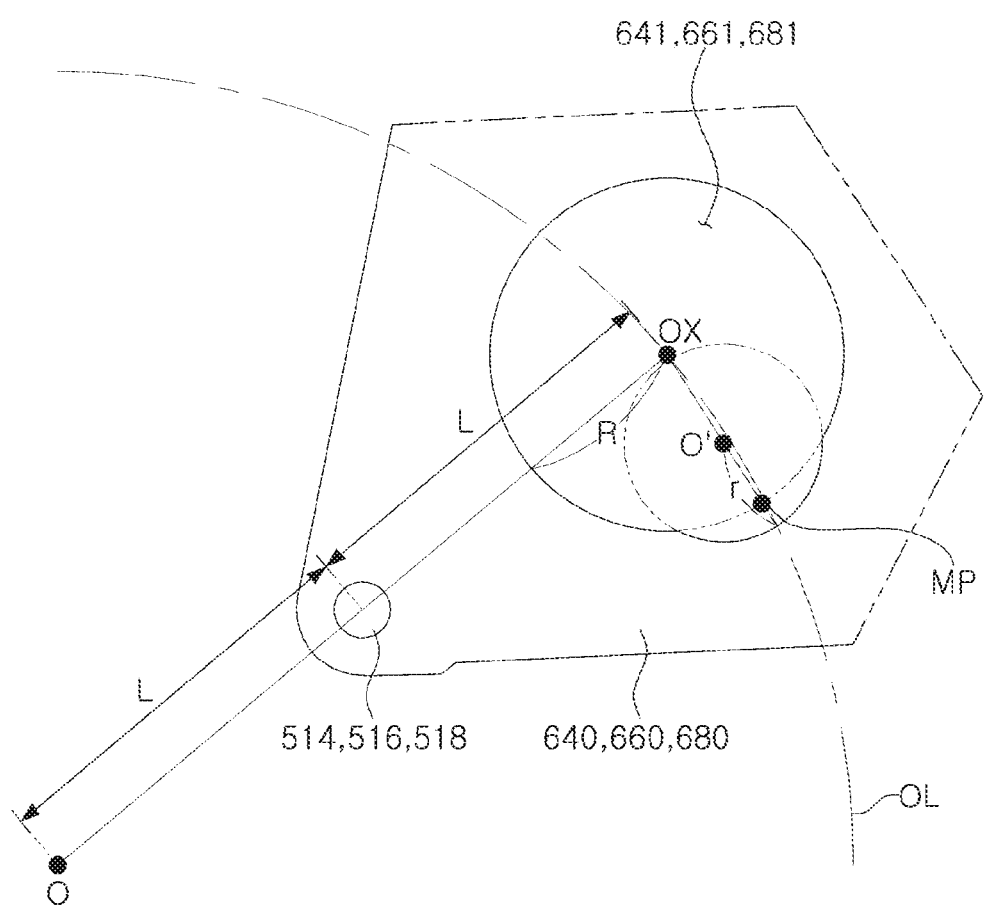
FIG. 11 is a view for describing a mechanism for specifying a position of an incident hole (opening) provided in the blades of the stop module illustrated in FIG. 8.
Figure 12:
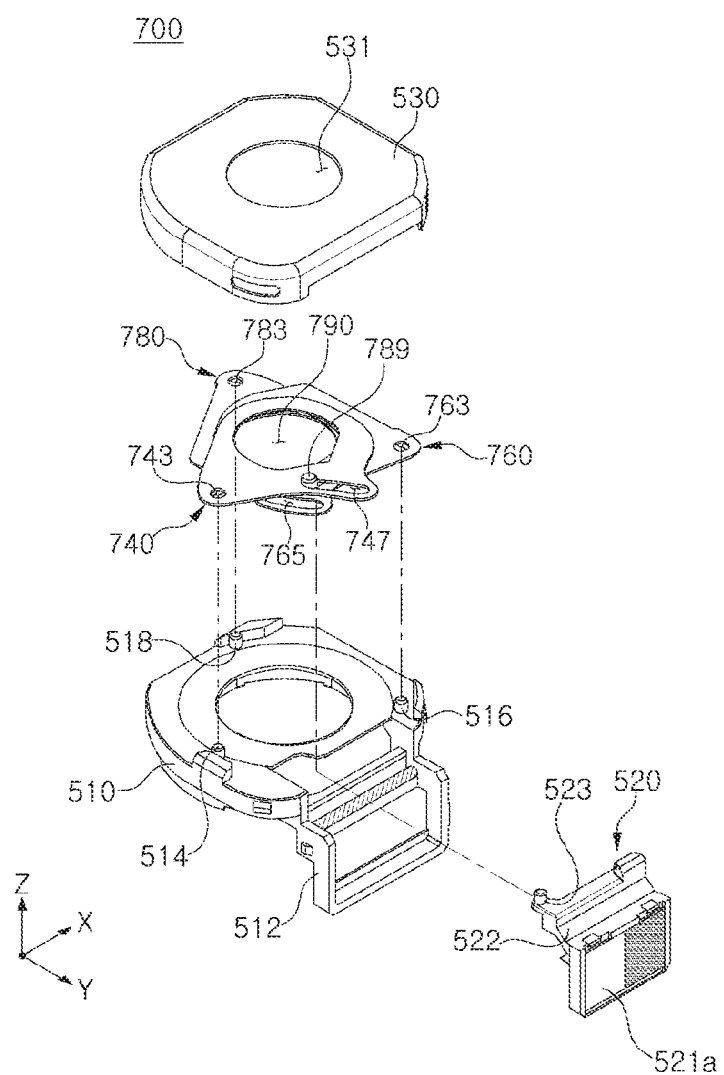
FIG. 12 is an exploded perspective view illustrating a stop module according to an example.

Referring to FIG. 11, the stop module 600 may continuously implement the incident holes of various sizes and allow the shape of the incident hole at a specific position to be square. For example, as illustrated in FIGS. 9A through 9C, the stop module 600 may include the first to third openings 641, 661, and 681 of approximately a circular shape, and may implement the incident hole of the smallest size or the largest size formed by the first to third openings 641, 661, and 681 as the circular shape.

In a case in which it is assumed that the incident hole formed in a state in which the first to third blades 640, 660, and 680 overlap with each other by positioning the magnet portion 520 at the end portion of one side has the largest size, a size (a circle having a radius 'R', hereinafter referred to as "large diameter") of the circular openings of the same size may be determined in the first to third blades 640, 660, and 680. Here, the center of the large diameter circle may coincide with the optical axis OX.

Matched points MP at which a circle OL having a position spaced apart from the first to third shaft protrusions 514, 516, and 518, which are the rotation shaft of any one of the first to third blades 640, 660, and 680, by a distance L between the first to third shaft protrusions 514, 516, and 518 and the optical axis in an opposite direction of the optical axis OX as the center O and having a distance 2L between the center O and the optical axis as a radius is in contact with the first to third openings 641, 661, and 681 of the circular shape may be confirmed.

When a radius r of a case in which the incident hole formed in a state in which the first to third blades 640, 660, and 680 overlap with each other has the smallest size is confirmed, and a circle (hereinafter, referred to 'small diameter') having the center O' on a line connecting the optical axis OX and the matched points MP to each other and having a radius 'r' is drawn, the first to third openings 641, 661, and 681 extended in a shape in which the small diameter slightly protrudes to the outside of the large diameter may be provided, and the incident hole of the largest size (the incident hole of the radius R) and the incident hole of the smallest size (the incident hole of the radius r) formed by the first to third openings 641, 661, and 681 may be implemented in the circular shape.

A portion protruding to the outside of the large diameter may correspond to ⅓ of a circumference of the small diameter. Therefore, when the first to third blades 640, 660, and 680 overlap with each other at a predetermined position, an incident hole of a small diameter circular shape whose center is the optical axis OX may be accurately formed.

FIGS. 12 through 15 are views for describing a stop module according to another example. Since a stop module 700 illustrated in FIGS. 12 through 15 has the same components as those of the stop module 500 described with reference to FIGS. 4 through 7 and has shapes of first to third openings provided in first to third blades which are different from those of the stop module 500, other components other than the first to third blades are denoted by the same reference numerals, the description of other components is replaced with that described with referent to FIGS. 4 through 7, and only the first to third blades will be described.

A first blade 740, a second blade 760, and a third blade 780 may be coupled to the base 510 so that at least a portion of each of the blades overlaps with each other in the optical axis direction, and may be movable by the stop driving portion. As an example, the first to third blades 740, 760, and 780 may be rotationally movable in the same direction along the movement of the magnet portion 520 in one direction. Therefore, in a case in which the size of the incident hole increases when the magnet portion 520 moves in one direction, the size of the incident hole may be reduced when the magnet portion 520 moves in the other direction opposite to one direction.

At least portions of first to third openings 741, 761, and 781 may overlap with each other in the optical axis direction. The portions of the first to third openings 741, 761, and 781 may overlap with each other in the optical axis direction to form an incident hole through which light passes.

At least portions of the first to third openings 741, 761, and 781 may overlap with each other to form a plurality of incident holes having different diameters. As an example, all of the first to third openings 741, 761, and 781 may overlap with each other to form an incident hole having a relatively large diameter, and the portions of the first to third openings 741, 761, and 781 may overlap with each other to form an incident hole having a relatively small diameter. The incident hole may have a circular shape or a polygonal shape depending on the shapes of the first to third openings 741, 761, and 781.

Therefore, depending on a capturing environment, the light may be incident through any one of the plurality of incident holes.

Figure 13A:
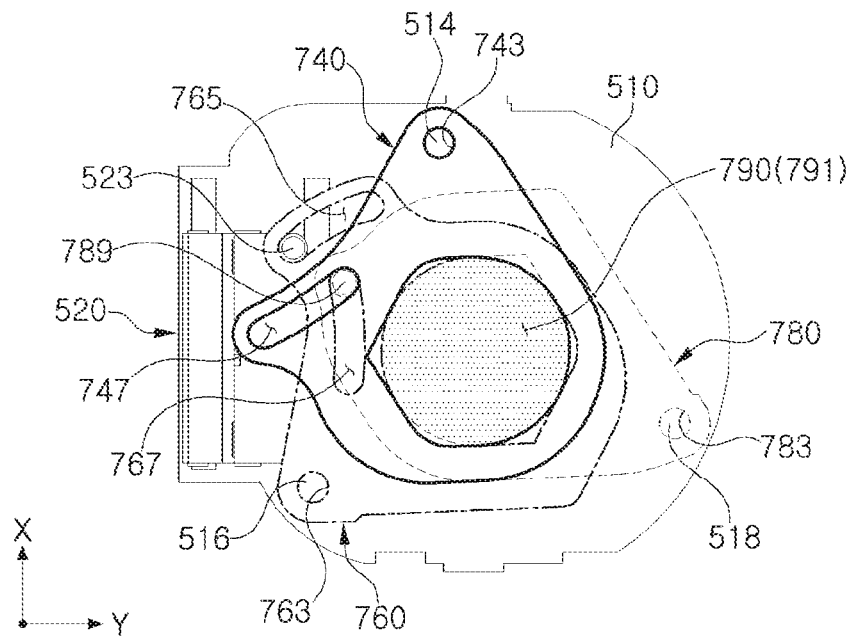
FIGS. 13A, 13B, and 13C are plan views illustrating a form in which the stop module is driven to change a diameter of an incident hole of the stop module illustrated in FIG. 12.

Referring to FIG. 13A, in a case in which the magnet portion 520 is positioned at an end portion of one side of the blades, the first to third openings 741, 761, and 781 of the first to third blades 740, 760, and 780 may be overlapped with each other by the stop driving portion to form an incident hole 790-791 of a circular shape having the largest diameter.

Figure 13B:
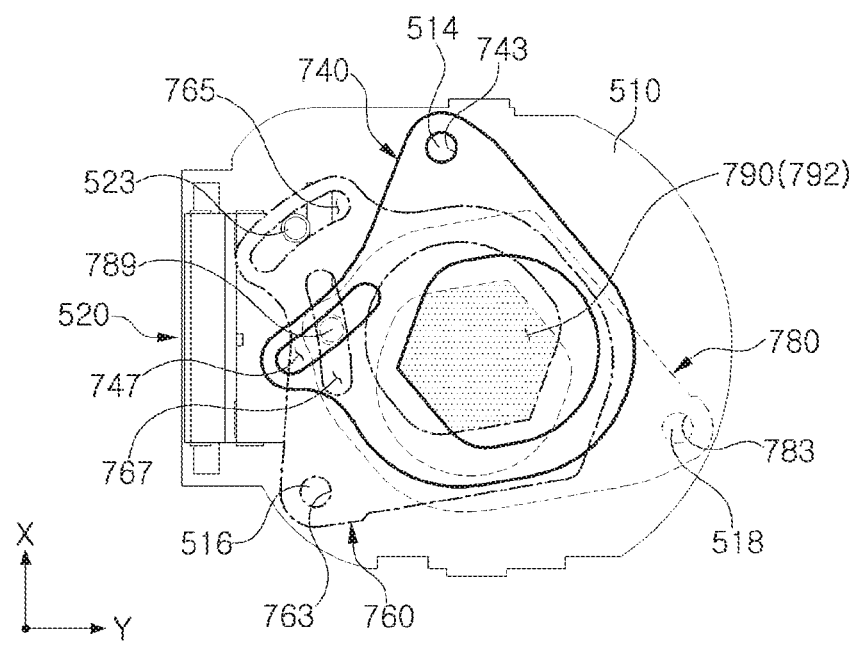

Referring to FIG. 13B, in a case in which the magnet portion 520 is positioned between end portions of one side and the other side of the blade, the first to third blades 740, 760, and 780 may rotationally move about the first to third shaft protrusions 514, 516, and 518 as the shaft by the stop driving portion, and the first to third openings 741, 761, and 781 may partially overlap with each other to form an incident hole 790-792 of a hexagonal or regular hexagonal shape having approximately a medium diameter.

Figure 13C:
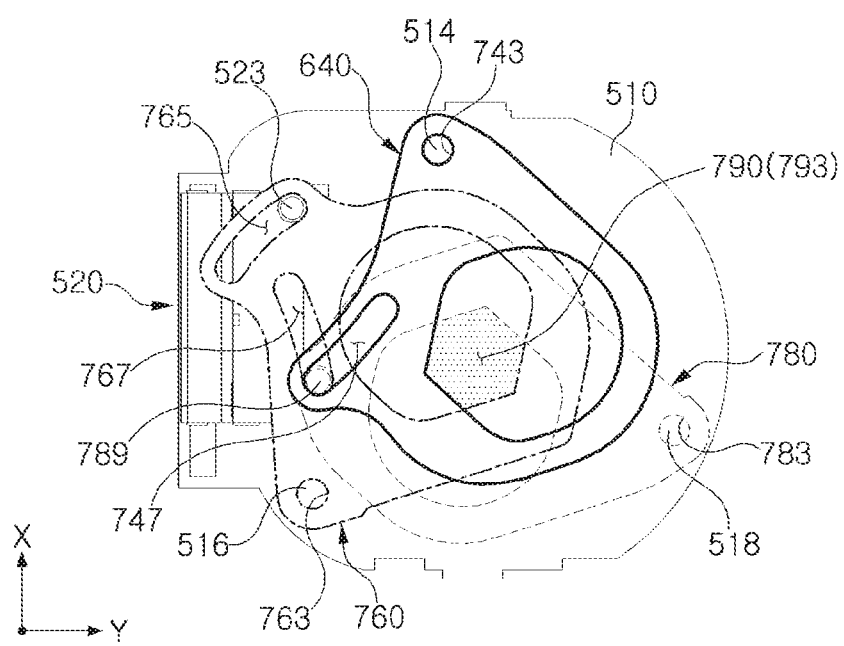
Figure 14:
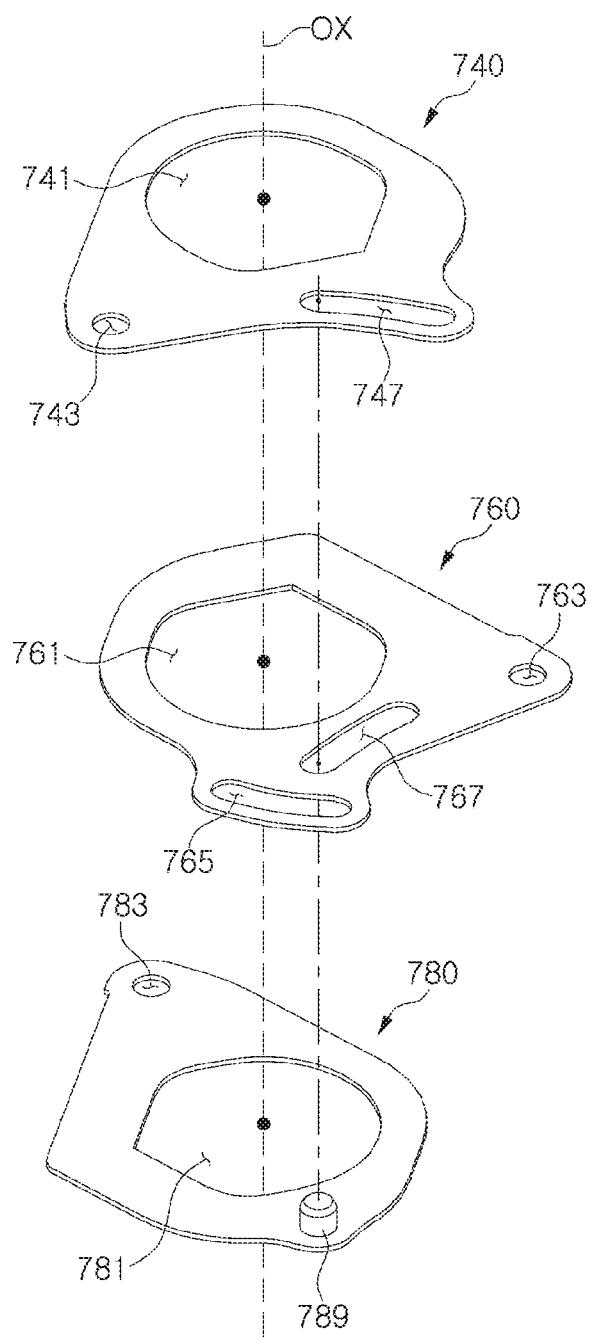
FIG. 14 is an exploded perspective view of blades provided in the stop module illustrated in FIG. 12.

Referring to FIG. 13C, in a case in which the magnet portion 520 is positioned at an end portion of the other side of the blade opposite to one side thereof, the first to third blades 740, 760, and 780 may rotationally move about the first to third shaft protrusions 514, 516, and 518 as the shaft by the stop driving portion, and the first to third openings 741, 761, and 781 may partially overlap with each other to form an incident hole 790-793 of a hexahedral or regular hexagonal shape having the smallest diameter.

Although not illustrated, the magnet portion 520 may be moved to positions other than the positions illustrated in FIGS. 13A through 13C. Therefore, the stop module 700 may change the sizes of the incident holes in three stages or continuously implement incident holes having various sizes.

Although FIGS. 13A through 13C illustrate that the size of the incident hole is smaller or larger as the magnet portion 520 moves from the end portion of one side of the blade to the end portion of the other side thereof, the size of the incident hole may also be changed by other methods. For example, when the magnet portion 520 is approximately at the middle portion, the incident hole may have the largest size, when the magnet portion 520 moves to the end portion of one side of the blade, the incident hole having the smallest size may be implemented, and when the magnet portion 520 moves to the end portion of the other side of the blade, the incident hole having the medium size may be implemented.

Meanwhile, since first to third holes 743, 763, and 783 and first to third guide holes 765, 767, and 747 in the stop module 700 have the same shapes and functions as those of the first to third holes 543, 563, and 583 and the first to third guide holes 565, 567, and 547 of the stop module 500 of FIGS. 4 through 7, a detailed description thereof is omitted.

Figure 15:
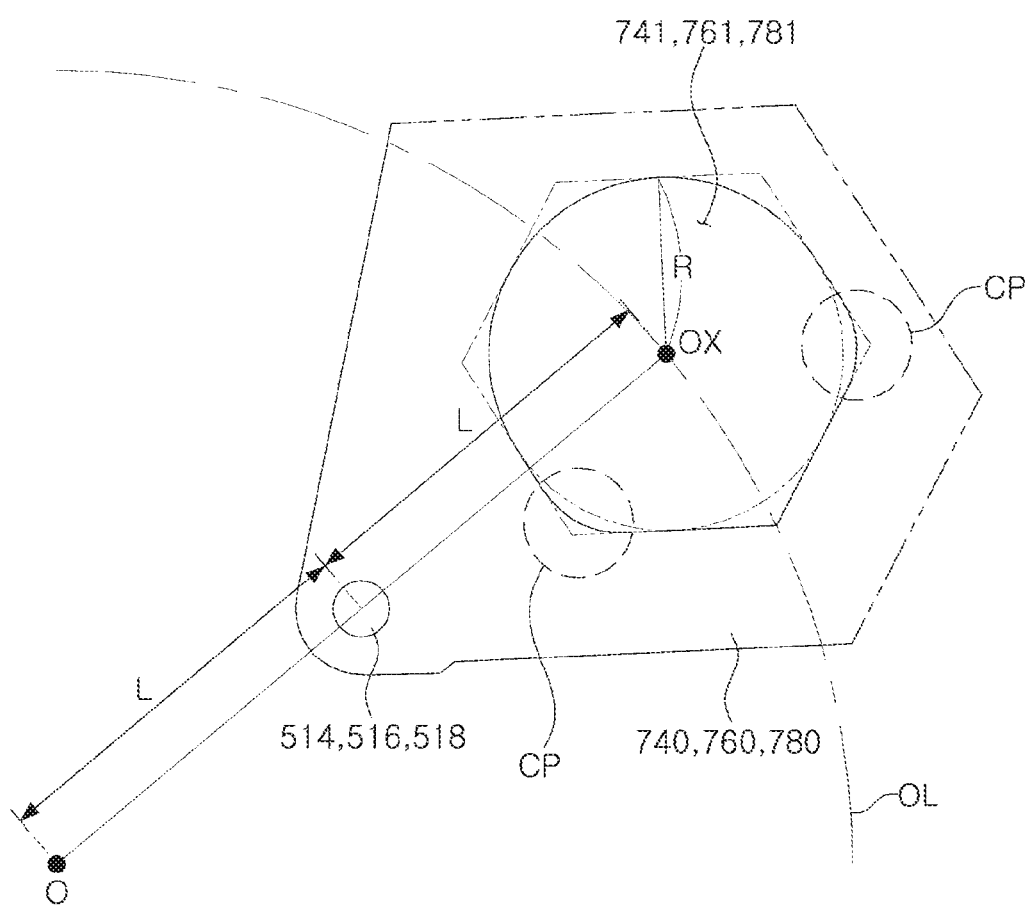
FIG. 15 is a view for describing a mechanism for specifying a position of an incident hole (opening) provided in the blades of the stop module illustrated in FIG. 12.
Figure 16:
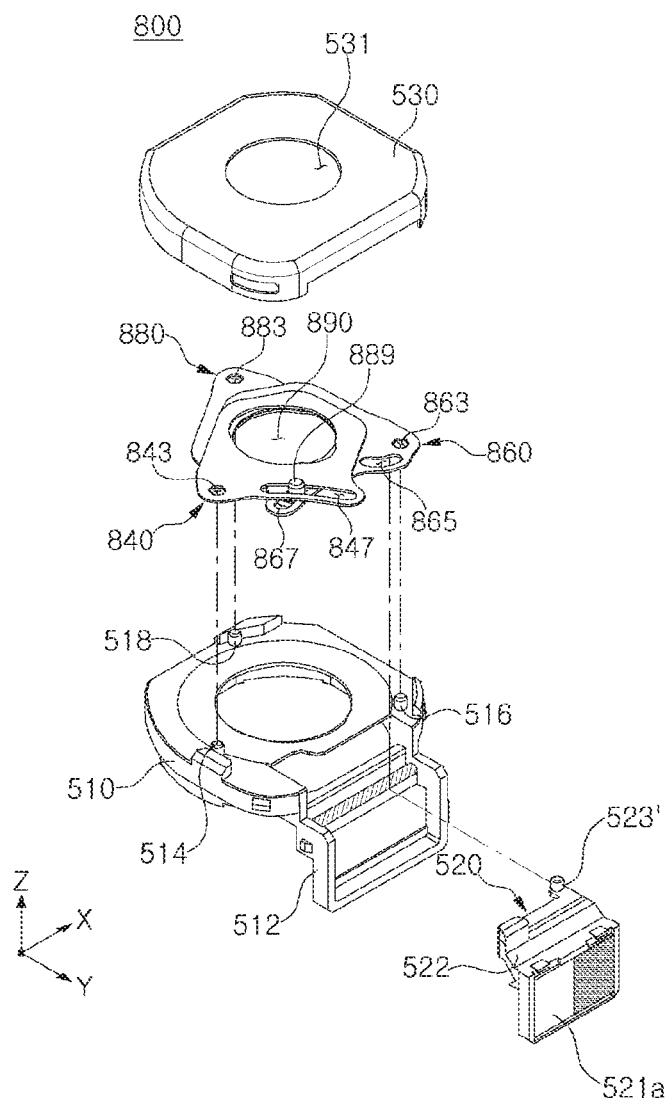
FIG. 16 is an exploded perspective view illustrating a stop module according to an example.

Referring to FIG. 15, the stop module 700 may continuously implement the incident holes of various sizes and allow the shape of the incident hole at most positions to be square. For example, as illustrated in FIGS. 13A through 13C, a portion of the first to third openings 741, 761, and 781 may be provided as an arc (a radius R) of a circle and the rest thereof may be provided in a regular hexagon, such that an incident hole having the largest size formed by the first to third openings may be implemented in a circular shape, an incident hole of a predetermined size or less may be implemented in a regular hexagon, and an incident hole of a size between the largest size and the predetermined size may be implemented in a shape in which the circular shape and the regular hexagon are mixed.

A method of implementing thereof may be substantially the same as the design method for 'providing the first to third openings 541, 561, and 581 of the regular hexagon and implementing the incident holes of all sizes formed by the first to third openings as the regular hexagon' described with reference to FIG. 7. However, since there is only a difference that the portion of the first to third openings 741, 761, and 781 is provided as the arc of the circle and the rest thereof is provided as a portion of the regular hexagon, a detailed description thereof is omitted.

Meanwhile, in FIG. 15, a corner portion CP forming the portion of the first to third openings 741, 761, and 781 may partially maintain a shape of the regular hexagon or may be deformed into a somewhat round shape.

FIGS. 16 through 19 are views for describing a stop module according to another example. A stop module 800 illustrated in FIGS. 16 through 19 has the same components as those of the stop module 500 described with reference to FIGS. 4 through 7, and has differences that a position of a first driving protrusion 523' provided in the magnet portion 520 is moved to an opposite side to change a first guide hole 865 of a second blade 860 into which the first driving protrusion 523' is inserted, the positions and shapes of second and third guide holes 867 and 847 provided in first and second blades 840 and 860 are somewhat changed, and the shapes of the first to third openings included in the first to third blades are different. Therefore, other components other than the first to third blades are denoted by the same reference numerals, the description of other components is replaced with that described with referent to FIGS. 4 through 7, and only the first to third blades will be described.

The first blade 840, the second blade 860, and a third blade 880 may be coupled to the base 510 so that at least a portion of each of the blades overlaps with each other in the optical axis direction, and may be movable by the stop driving portion. As an example, the first to third blades 840, 860, and 880 may be rotationally movable in the same direction along the movement of the magnet portion 520 in one direction. Therefore, in a case in which the size of the incident hole increases when the magnet portion 520 moves in one direction as in the above-described examples with reference to FIGS. 4 through 15, the size of the incident hole may be reduced when the magnet portion 520 moves in the opposite direction of the one direction.

However, the present disclosure is not limited to such a driving condition. In a case in which the stop module is configured such that the incident hole has the largest size when the magnet portion 520 is approximately in the middle of a moving section of an actuator, the incident hole may be implemented to have approximately a middle size when the magnet portion 520 moves to the end portion of one side and the incident hole may be implemented to have the smallest size when the magnet portion 520 moves to the end portion of the other side opposite to the one side. In this case, even though the magnet portion 520 moves in one direction, the size of the incident hole may be increased and decreased.

The size of the incident holes sequentially changed, or increase and decreased or decreased or increased according to the movement of the magnet portion 520 in one direction may be variously selected according to the design structure. Hereinafter, as another example of a stop module 800, a structure in which the size of the incident hole is increased and decreased according to the movement of the magnet portion 520 in one direction—the movement in a direction from the end portion of one side to the end portion of the other side or a direction from the end portion of the other side to the end portion of one side—will be described.

At least portions of the first to third openings 841, 861, and 881 may overlap with each other in the optical axis direction. The portions of the first to third openings 841, 861, and 881 may overlap with each other in the optical axis direction to form an incident hole through which light passes.

At least portions of the first to third openings 841, 861, and 881 may overlap with each other to form a plurality of incident holes having different diameters. As an example, all of the first to third openings 841, 861, and 881 may overlap with each other to form an incident hole having a relatively large diameter, and the portions of the first to third openings 841, 861, and 881 may overlap with each other to form an incident hole having a relatively small diameter. The incident hole may have a circular shape or a polygonal shape depending on the shapes of the first to third openings 841, 861, and 881.

Therefore, depending on a capturing environment, the light may be incident through any one of the plurality of incident holes.

Figure 17A:
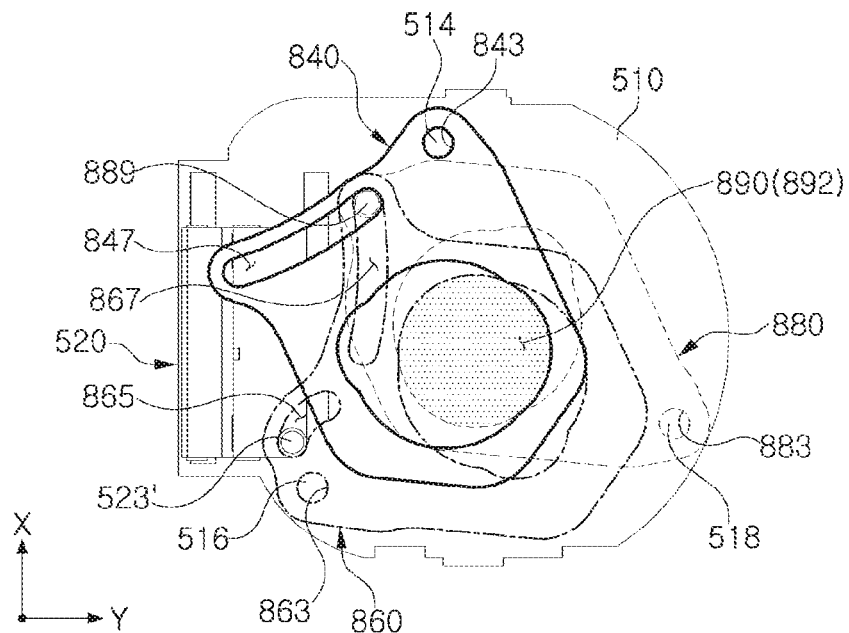
FIGS. 17A, 17B, and 17C are plan views illustrating a form in which the stop module is driven to change a diameter of an incident hole of the stop module illustrated in FIG. 16.

Referring to FIG. 17A, in a case in which the magnet portion 520 is positioned approximately at the middle of the driving path of the driving portion, the first to third openings 841, 861, and 881 of the first to third blades 840, 860, and 880 may be almost all overlapped with each other by the stop driving portion to form an incident hole 890-891 having the largest diameter.

Figure 17B:
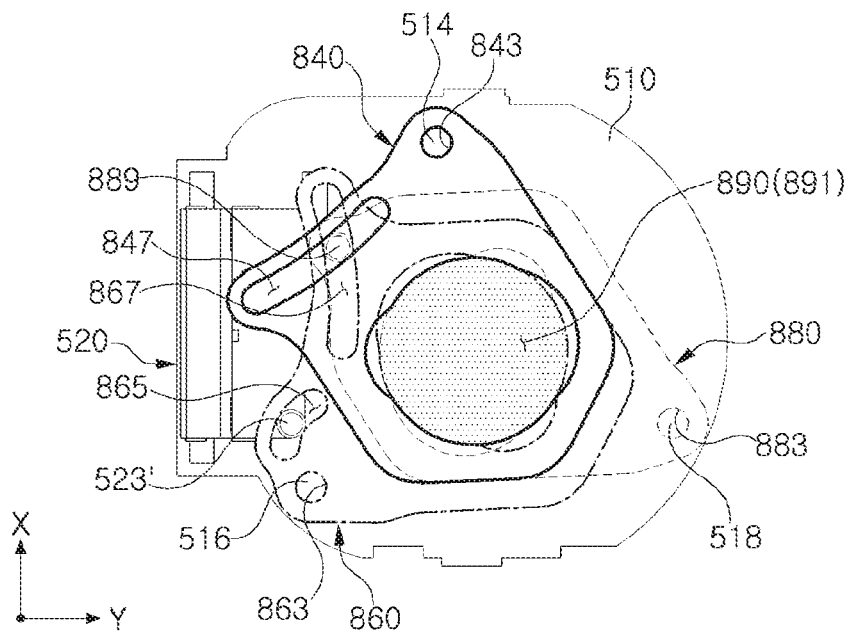

Referring to FIG. 17B, in a case in which the magnet portion 520 is positioned at the end portion of one side of the blade, the first to third blades 840, 860, and 880 may rotationally move about the first to third shaft protrusions 514, 516, and 518 as the shaft by the stop driving portion, and the first to third openings 641, 661, and 681 may partially overlap with each other to form an incident hole 890-892 having approximately a medium diameter.

Figure 17C:
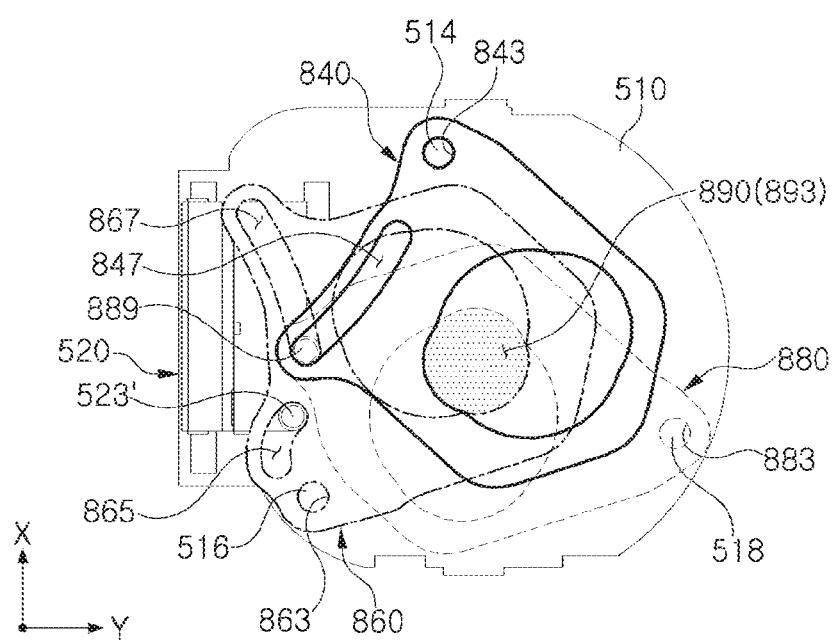
Figure 18:
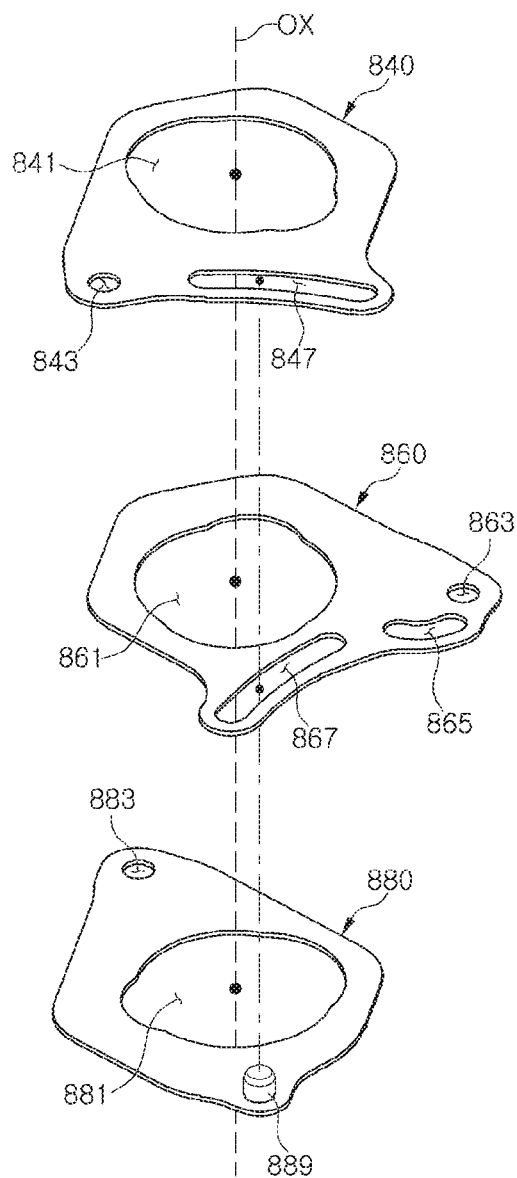
FIG. 18 is an exploded perspective view of blades provided in the stop module illustrated in FIG. 16.

Referring to FIG. 17C, in a case in which the magnet portion 520 is positioned at an end portion of the other side of the blade opposite to one side thereof, the first to third blades 840, 860, and 880 may rotationally move about the first to third shaft protrusions 514, 516, and 518 as the shaft by the stop driving portion, and the first to third openings 841, 861, and 881 may partially overlap with each other to form an incident hole 890-893 having the smallest diameter.

Although not illustrated, the magnet portion 520 may be moved to positions other than the positions illustrated in FIGS. 17A through 17C. Therefore, the stop module 800 may change the sizes of the incident holes in three stages or continuously implement incident holes having various sizes.

As illustrated in FIGS. 17A through 17C, when the magnet portion 520 is approximately at the middle portion, the incident hole may have the largest size, when the magnet portion 520 moves to the end portion of one side of the blade, the incident hole having the smallest size may be implemented, and when the magnet portion 520 moves to the end portion of the other side of the blade, the incident hole having the medium size may be implemented. However, the size of the incident hole may be changed by various methods. For example, the size of the incident hole may be decrease or increased as the magnet portion 520 moves from the end portion of one side to the end portion of the other side.

Since the first to third holes 843, 863, and 883 in the stop module 800 have the same shapes and functions as those of the first to third holes 543, 563, and 583 of the stop module 500 of FIGS. 4 through 7, a detailed description thereof is omitted. Since the first to third guide holes 865, 867, and 847 in the stop module 800 have the same shapes and positions as those of the first to third guide holes 565, 567, and 547 of the stop module 500 of FIGS. 4 through 7, a detailed description thereof is omitted.

Figure 19:
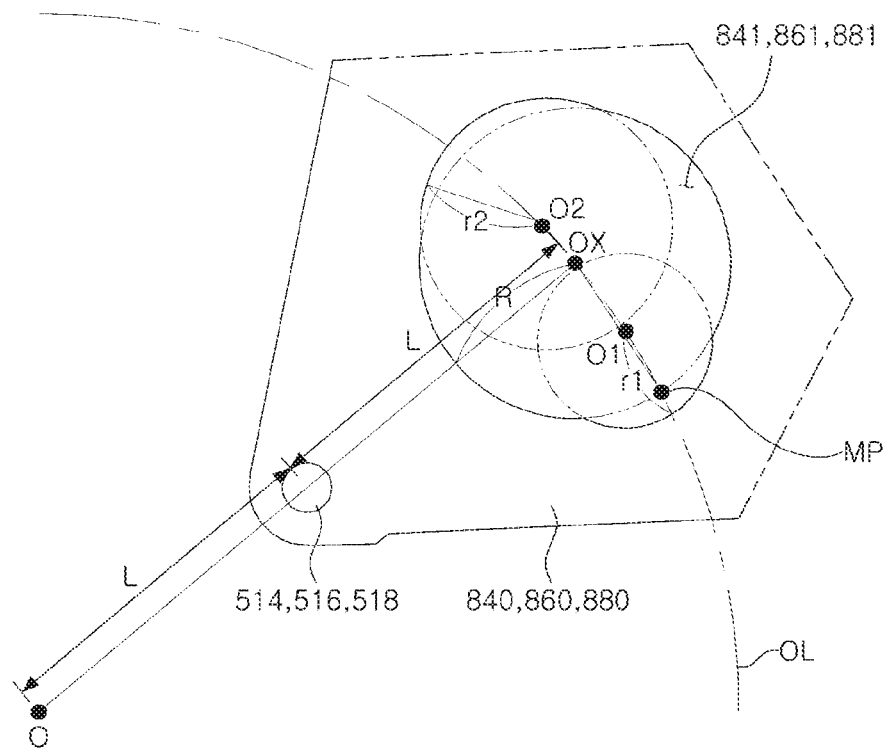
FIG. 19 is a view for describing a mechanism for specifying a position of an incident hole (opening) provided in the blades of the stop module illustrated in FIG. 16.

Referring to FIG. 19, the stop module 800 may continuously implement the incident holes of various sizes and allow the shape of the incident hole at a specific position to be square. For example, as illustrated in FIGS. 18A through 18C, the stop module 800 may include the first to third openings 841, 861, and 881 of approximately a circular shape, and may implement the incident holes of the smallest size, a medium size, and the largest size formed by the first to third openings 841, 861, and 881 as the circular shape.

Therefore, in the case of the stop of a three-stage diameter deformed structure, the stop of all diameters may be implemented in the circular shape.

In a case in which it is assumed that the incident hole formed in a state in which the first to third blades 840, 860, and 880 overlap with each other by positioning the magnet portion 520 approximately at the middle, a size (a circle having a radius 'R', hereinafter referred to as "large diameter") of the circular openings of the same size may be determined in the first to third blades 840, 860, and 880. The center of the large diameter circle may coincide with the optical axis OX.

Matched points MP at which a circle OL (hereinafter, referred to 'virtual circle') having a position spaced apart from the first to third shaft protrusions 514, 516, and 518, which are the rotation shaft of any one of the first to third blades 840, 860, and 880, by a distance L between the first to third shaft protrusions 514, 516, and 518 and the optical axis in an opposite direction of the optical axis OX as the center O and having a distance 2L between the center O and the optical axis as a radius is in contact with the first to third openings 841, 861, and 881 of the circular shape may be confirmed.

When a radius r of a case in which the incident hole formed in a state in which the first to third blades 840, 860, and 880 overlap with each other has the smallest size is confirmed, and a circle (hereinafter, referring to 'small diameter') having the first center O1' on a line connecting the optical axis OX and the matched points MP to each other and having a radius 'r' is drawn, a shape in which the small diameter slightly protrudes to the outside of the large diameter may be implemented. In this case, a portion protruding to the outside of the large diameter may correspond to ⅓ of a circumference of the small diameter. Therefore, when the first to third blades 840, 860, and 880 overlap with each other at a predetermined position, an incident hole of a small diameter circular shape whose center is the optical axis OX may be accurately formed.

When a radius r2 of the case in which the incident hole formed by the first to third blades 840, 860, and 880 overlapping each other has the medium size is confirmed, and a circle (hereinafter, referred to 'a medium diameter') having the center on an arc of a virtual circle having a radius of 2L and having the radius 'r2' is drawn, a shape in which the medium diameter slightly protrudes to the outside of the large diameter may be implemented. In this case, a portion protruding to the outside of the large diameter may correspond to ⅓ of a circumference of the medium diameter. Therefore, when the first to third blades 84, 860, and 880 overlap with each other at a predetermined position, an incident hole of a medium diameter circular shape whose center is the optical axis OX may be accurately formed.

Therefore, the first to third openings 841, 861, and 881 extended in the shape in which the small diameter and the medium diameter slightly protrude to the outside of the large diameter may be provided, and the incident holes of the largest size, the medium size, and the smallest size formed by the first to third openings 841, 861, and 881 may be implemented in the circular shape.

As described above, in the camera module according to the examples, the amount of incident light may be selectively changed through the stop module, deterioration of performance of the autofocusing function may be prevented even though the stop module is mounted in the camera module, and an increase in the weight of the camera module due to the use of the stop module may be significantly reduced. In addition, the size of the incident hole of the stop module may be changed in the three stages or continuously, and in most cases, the incident hole may be square (regular polygonal or circular shape).

Further, for the purpose of explanation, the incident hole implemented by the three blades having the hexagonal (regular hexagonal) or circular opening has been mainly described, but the incident hole is not limited to such a configuration. The shape of the opening may be polygonal (triangular, pentagonal, octagonal, etc.), and the number of blades may be three or more.

As set forth above, according to the examples, the camera module may maintain the performance of the autofocusing and optical image stabilization functions by significantly reducing the increase in the weight of the driving part even though the stop module is mounted in the camera module.

In addition, the stop module may accurately implement various apertures.

In addition, the stop module may accurately implement a consecutive aperture change as well as a stop aperture change of a multi-stage structure.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A stop module comprising:
   a base;
   blades sequentially overlapping each other on the base and configured to rotate about separate rotation shafts to form incident holes having different sizes; and
   a magnet portion configured to provide a driving force to rotate the blades,
   wherein only one of the blades is a driving blade, which is directly interlocked with the magnet portion, and the blades other than the driving blade comprise at least two driven blades configured to be driven to be interlocked with the driving blade with a common driving protrusion and not directly connected to the magnet portion.

2. The stop module of claim 1, wherein the separate rotation shafts of the blades are connected to each other to form a regular polygon.

3. The stop module of claim 2, wherein a center of gravity of the regular polygon formed by the connection of the separate rotation shafts of the blades substantially coincides with an optical axis.

4. The stop module of claim 1, wherein rotation angles of the blades are substantially the same.

5. The stop module of claim 1, wherein each of the blades comprise an opening of a same size and a same shape, and the openings are overlapped to form the incident holes having different sizes.

6. The stop module of claim 5, wherein at least a portion of the openings is a portion of a regular N-polygon, where N is natural number.

7. The stop module of claim 6, wherein, in a case in which a specific incident hole, among the incident holes, is formed in a state in which the blades overlap with each other, positions of the openings are formed so that a circle having a position spaced apart from the rotation shaft of any one of the blades by a distance L between the rotation shaft and an optical axis in an opposite direction of the optical axis as the center, and having a distance 2L between the center and the optical axis as a radius is in contact with any one of vertices of the openings having at least a portion of the regular N-polygon.

8. The stop module of claim 7, wherein the openings are regular N-polygons.

9. The stop module of claim 7, wherein a portion of the openings is an arc of a circle, and a remainder of the openings is a portion of the regular N-polygon.

10. The stop module of claim 7, wherein there are a total of three blades.

11. The stop module of claim 7, wherein the incident holes all have a circular shape or a regular N-polygon shape.

12. The stop module of claim 11, further comprising a position sensor disposed to face a magnet of the magnet portion and configured to sense a position of the magnet portion.

13. The stop module of claim 5, wherein each of the openings have a shape in which at least two circular holes of different sizes are connected to each other.

14. The stop module of claim 13, wherein the circular holes include a large diameter and at least one small diameter having a radius smaller than a radius of the large diameter,
   the large diameter is a same size as a size of an incident hole having a largest size,
   in a case in which a specific incident hole, among the incident holes, is formed in a state in which the blades overlap with each other, the at least one small diameter is a circle having a center on a straight line connecting matched points and an optical axis to each other and having a radius r, and
   the matched points are points at which a circle having a position spaced apart from the rotation shaft of any one of the blades by a distance L between the rotation shaft and the optical axis in an opposite direction of the optical axis as the center, and having a distance 2L between the center and the optical axis as a radius is in contact with the openings.

15. The stop module of claim 1, wherein the magnet is configured to be linearly moved in a direction approximately perpendicular to an optical axis direction.

16. A stop module comprising:
   a base; and
   blades sequentially overlapping each other on the base and configured to rotate about separate rotation shafts to form incident holes having different sizes,
   wherein each of the blades comprises an opening, and at least a portion of the openings have a portion of a regular N-polygon, where N is a natural number, and
   in a case in which a specific incident hole, among the incident holes, is formed in a state in which the blades overlap with each other, positions of the openings are formed so that a circle having a position spaced apart from the rotation shaft of any one of the blades by a distance L between the rotation shaft and an optical axis in an opposite direction of the optical axis as the center, and having a distance 2L between the center and the optical axis as a radius is in contact with any one of vertices of the openings having at least a portion of the regular N-polygon.

17. A camera module comprising:
a lens module accommodated in a housing; and
the stop module of claim 16 configured to continuously form the incident holes of different sizes,
wherein the stop module comprises a magnet portion interlocked with the blades to provide driving force and a coil provided in the lens module disposed to face the magnet portion.

18. A camera module comprising:
a lens module;
overlapping blades configured to form incident holes of different sizes to selectively change an amount of light incident on the lens module; and
a magnet portion configured to move linearly along a driving path in a direction perpendicular to an optical axis to rotate the blades to form the incident holes,
wherein the magnet portion is directly connected to only one blade among the blades and the magnet portion is configured to rotate the one blade a rotational amount proportional to an amount of movement of the magnet portion along the driving path, and
wherein the blades other than the one blade comprise at least two driven blades configured to be driven to be interlocked with the one blade with a common driving protrusion.

19. The camera module of claim 18, wherein in a case in which the magnet portion is moved to a first end of the driving path, the blades are rotated to form an incident hole having a smallest size among the incident holes, and
in a case in which the magnet portion is moved to a second end of the driving path, the blades are rotated to form an incident hole having a largest size among the incident holes.

20. The camera module of claim 19, wherein the magnet portion comprises a driving protrusion configured to fit into a guide hole of the one blade.

21. The camera module of claim 20, wherein the guide hole is curved.

* * * * *